US012576641B2

(12) United States Patent
Otsuka

(10) Patent No.: US 12,576,641 B2
(45) Date of Patent: Mar. 17, 2026

(54) CHANNEL-FORMING SUBSTRATE, PRINT HEAD, AND METHOD OF MANUFACTURING CHANNEL-FORMING SUBSTRATE

(71) Applicant: CANON KABUSHIKI KAISHA, Tokyo (JP)

(72) Inventor: Manabu Otsuka, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 186 days.

(21) Appl. No.: 18/482,116

(22) Filed: Oct. 6, 2023

(65) Prior Publication Data

US 2024/0140094 A1 May 2, 2024

(30) Foreign Application Priority Data

Oct. 31, 2022 (JP) ................................ 2022-174609

(51) Int. Cl.
*B41J 2/14* (2006.01)
*B41J 2/16* (2006.01)

(52) U.S. Cl.
CPC ........... *B41J 2/14233* (2013.01); *B41J 2/161* (2013.01); *B41J 2/1623* (2013.01); *B41J 2/1635* (2013.01); *B41J 2002/14306* (2013.01); *B41J 2002/14362* (2013.01); *B41J 2002/14419* (2013.01); *B41J 2002/14491* (2013.01); *B41J 2/1642* (2013.01); *B41J 2/1646* (2013.01)

(58) Field of Classification Search
CPC ...... B41J 2/14233; B41J 2/161; B41J 2/1623; B41J 2/1635; B41J 2/1642; B41J 2/1646; B41J 2002/14306; B41J 2002/14362; B41J 2002/14419; B41J 2002/14491; B41J 2/1628; B41J 2/1629; B41J 2/1631
See application file for complete search history.

(56) References Cited

U.S. PATENT DOCUMENTS

2022/0274406 A1* 9/2022 Higuchi ................ B41J 2/1623

FOREIGN PATENT DOCUMENTS

JP 2004082650 A * 3/2004
JP 2006-272746 A 10/2006

OTHER PUBLICATIONS

Makita Hideyuki, "Liquid Droplet Jetting Head and Ink Jet Recorder" (JP 2004082650 A), Mar. 18, 2004, [Paragraph 0025, see Figs. 8-9] (Year: 2004).*
Murakami et al., U.S. Appl. No. 18/522,481, filed Nov. 29, 2023.

* cited by examiner

*Primary Examiner* — Lisa Solomon
(74) *Attorney, Agent, or Firm* — VENABLE LLP

(57) ABSTRACT

An object is to provide a channel-forming substrate capable of suppressing protrusion of a bonding adhesive while maintaining rigidity. The channel-forming substrate includes a first substrate in which a hollow portion to be a liquid channel is formed and a second substrate bonded to the first substrate with a bonding adhesive, in the first substrate, a plurality of first grooves are intermittently formed in a bonding surface bonded to the second substrate, in the second substrate, a plurality of second grooves are intermittently formed in a bonding surface bonded to the first substrate, and in a case where the channel-forming substrate is viewed from above, the first grooves and the second grooves are arranged alternately so as to surround the hollow portion.

13 Claims, 19 Drawing Sheets

CHANNEL-FORMING SUBSTRATE, PRINT HEAD, AND METHOD OF MANUFACTURING CHANNEL-FORMING SUBSTRATE

BACKGROUND

Field of the Disclosure

The present disclosure relates to a channel-forming substrate, a print head, and a method of manufacturing the channel-forming substrate.

In general, a print head provided in a printing apparatus that performs printing on a print medium while ejecting liquid includes an energy generating element that provides energy for ejecting liquid and is mounted with a channel-forming substrate in which a liquid channel is formed.

The steps of manufacturing the channel-forming substrate may include a step of bonding a plurality of substrate members with a bonding adhesive. There is known a technique of suppressing a protruding bonding adhesive flowing into a liquid channel in the step by forming an escape groove (hereinafter simply referred to as the "groove") in advance in any of a plurality of substrate members and releasing (that is, flowing) the protruding bonding adhesive into the groove.

Japanese Patent Laid-Open No. 2006-272746 discloses a channel-forming substrate in which a plurality of grooves are arranged intermittently so as to surround a liquid channel (channel base).

However, in the channel-forming substrate disclosed in Japanese Patent Laid-Open No. 2006-272746, a plurality of grooves are intermittently formed, and it is difficult to release a bonding adhesive between the grooves. Thus, in a case where a protruding bonding adhesive cannot be released sufficiently, the bonding adhesive may flow into the liquid channel formed in the channel-forming substrate.

On the other hand, instead of intermittently forming a plurality of grooves, continuously forming one groove so that the groove surrounds a circumference of the liquid channel is also conceivable. However, although continuously forming one groove can increase the amount of bonding adhesives that can be released, the rigidity of the channel-forming substrate is less than that in a case where a plurality of grooves are intermittently formed.

An object of a technique according to the present disclosure is then to provide a channel-forming substrate capable of suppressing protrusion of a bonding adhesive while maintaining rigidity.

SUMMARY

In a present disclosure, there is provided, a channel-forming substrate according to the present disclosure is a channel-forming substrate including a first substrate in which a hollow portion to be a liquid channel is formed and a second substrate bonded to the first substrate with a bonding adhesive, wherein in the first substrate, a plurality of first grooves are intermittently formed in a bonding surface bonded to the second substrate, in the second substrate, a plurality of second grooves are intermittently formed in a bonding surface bonded to the first substrate, and in a case where the channel-forming substrate is viewed from above, the first grooves and the second grooves are arranged alternately so as to surround the hollow portion.

Further features of the present invention will become apparent from the following description of exemplary embodiments with reference to the attached drawings.

DESCRIPTION OF THE EMBODIMENTS

A description will be given below of suitable embodiments of the technique according to the present disclosure with reference to the drawings. However, the dimensions, materials, shapes, relative positions, and the like of components described below should be appropriately changed depending on the configuration of an apparatus to which the technique according to the present disclosure is applied and various conditions. Thus, the technical scope of the present disclosure is not limited to the following description. Wellknown techniques or publicly-known techniques in this technical field can be applied to configurations and steps that are not specifically illustrated or described. Further, duplicate descriptions may be omitted.

A substrate for a liquid ejection head relating to the technique according to the present disclosure will be described below with reference to the drawings. Incidentally, in the embodiments described below, there are cases where specific descriptions are made in order to sufficiently explain the technique according to the present disclosure. However, they show a technically preferable example and do not limit the technical scope of the present disclosure.

The term “intermittently” used herein means a state of continuously being separated or continued physically.

First Embodiment

Print Head 100

Figure 1:
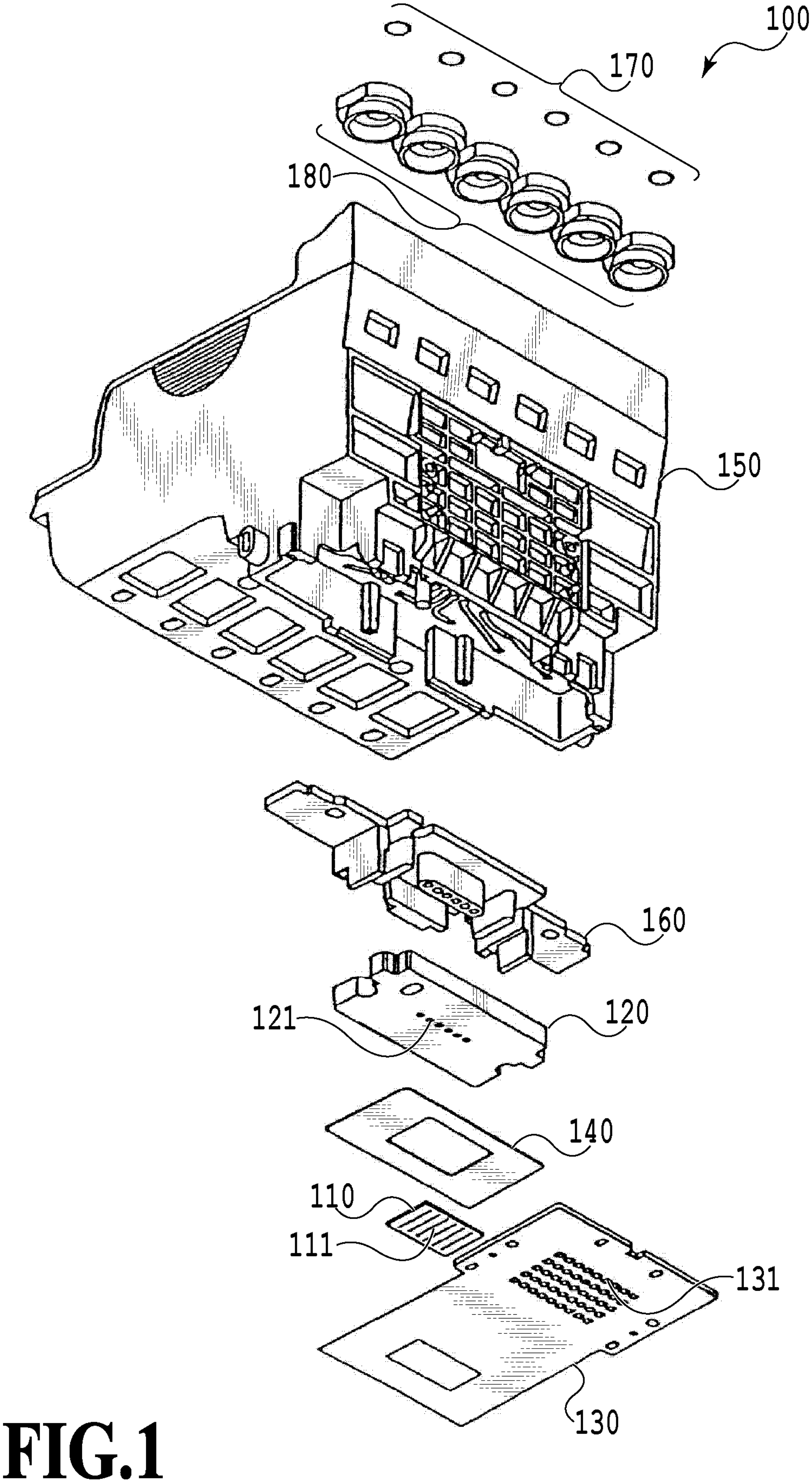
FIG. 1 is an exploded perspective view showing an example of a print head according to one embodiment.

FIG. 1 is an exploded perspective view showing an example of a print head 100 to which a channel-forming substrate 110 according to the present embodiment can be attached.

A printing apparatus (not shown) according to the present embodiment includes a liquid tank (not shown) that stores liquid and the print head 100 that ejects, from an ejection port 111, liquid supplied from the liquid tank according to printing information.

In the present example, the print head 100 is of a so-called cartridge system detachably mounted on a carriage (not shown). Cartridges (not shown) according to the present example are provided with liquid tanks independently containing, for example, black, light cyan, light magenta, cyan, magenta, and yellow inks. Each of these cartridges is detachable from and attachable to the print head 100.

As shown in FIG. 1, the print head 100 includes the channel-forming substrate 110 in which a plurality of ejection port arrays are formed, a first support member 120, an electric wiring substrate 130, a second support member 140, a tank holder 150, a channel-forming member 160, a filter 170, and a sealing rubber 180.

The channel-forming substrate 110 in which a plurality of ejection ports are formed is adhesively fixed to the first support member 120 via the second support member 140. In the first support member 120, there is formed a supply port 121 for supplying the channel-forming substrate 110 with liquid. Further, the first support member 120 is fluidly connected to the tank holder 150 via the channel-forming member 160.

The second support member 140 including an opening is adhesively fixed to the first support member 120. The electric wiring substrate 130 is held via the second support member 140 so as to be electrically connected to the channel-forming substrate 110. The electric wiring substrate 130 is used to apply an electric signal for ejecting liquid to the channel-forming substrate 110. The electric wiring substrate 130 includes electric wiring corresponding to the channel-forming substrate 110 and an external-signal input terminal 131 located at an end of the electric wiring to receive an electric signal from a main body. The external-signal input terminal 131 is located on and fixed to the back side of the tank holder 150.

On the other hand, the channel-forming member 160 is fixed by, for example, ultrasonic welding to the tank holder 150 that detachably holds the liquid tank (not shown). A liquid channel extending from the liquid tank (not shown) to the first support member 120 is formed in the tank holder 150. The filter 170 is arranged at an end on the liquid tank side of the liquid channel that engages the liquid tank (not shown). The filter 170 suppresses an invasion of dust from the outside. The sealing rubber 180 is mounted onto an engagement portion engaging the liquid tank (not shown). The sealing rubber 180 suppresses evaporation of liquid from the engagement portion.

In the present embodiment, there is formed a tank holder portion including the tank holder 150, the channel-forming member 160, the filter 170, and the sealing rubber 180. There is also formed a print element portion including the channel-forming substrate 110, the first support member 120, the electric wiring substrate 130, and the second support member 140. The print head 100 is formed by the tank holder portion and the print element portion being bonded to each other with a bonding adhesive or the like.

Configuration of Channel-Forming Substrate 100

Figure 2:
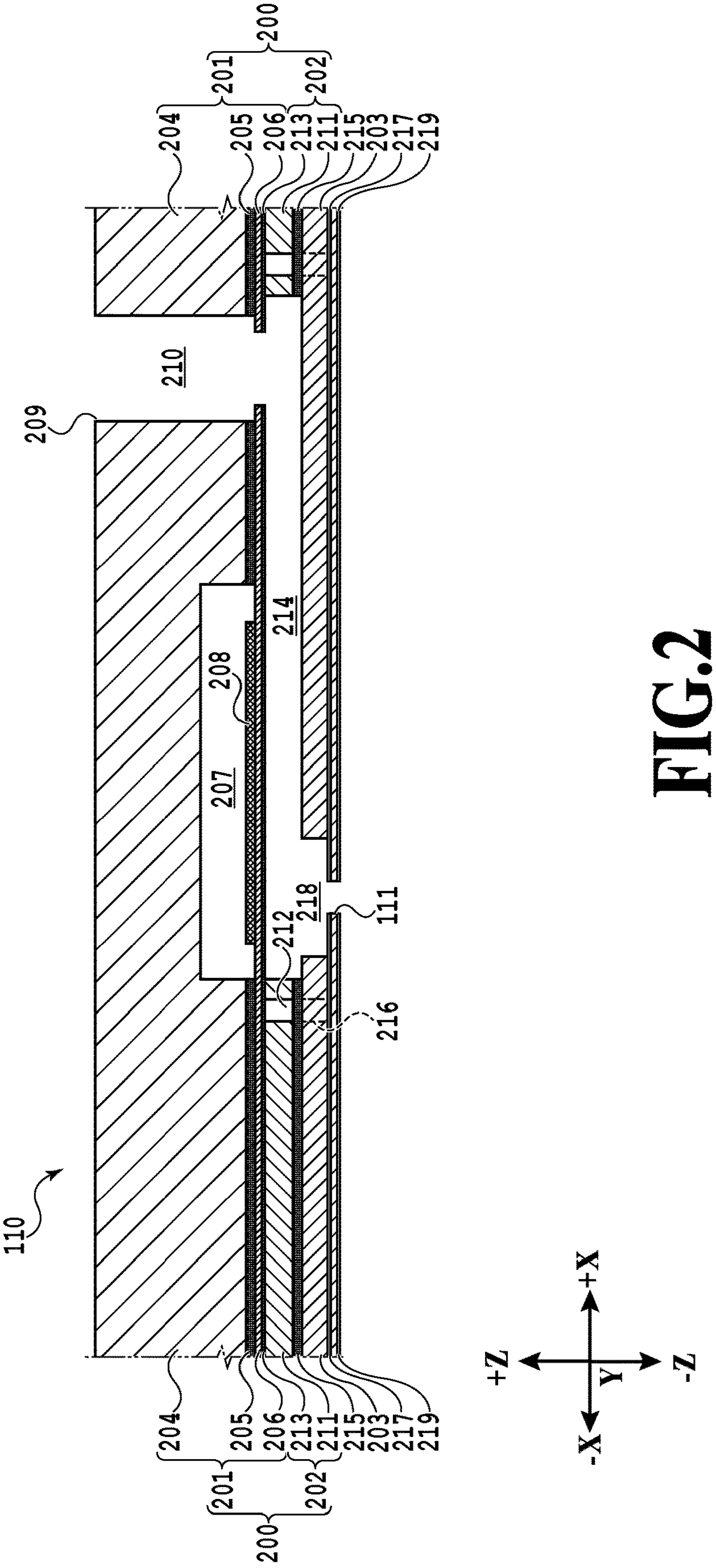
FIG. 2 is a schematic cross-sectional view of a channel-forming substrate according to one embodiment.

FIG. 2 is a schematic cross-sectional view of the channel-forming substrate 110 (e.g., a print element substrate) according to the present embodiment.

In the channel-forming substrate 110, a plurality of piezoelectric elements 208 (only one of which is shown in FIG. 2) for ejecting liquid and electric wiring of Al or the like for supplying each piezoelectric element 208 with power are formed inside an actuator substrate 200 by a film forming technique. A plurality of liquid channels corresponding to the piezoelectric elements 208 and a plurality of ejection ports 111 are formed in the channel-forming substrate 110 by a photolithography technique. In FIG. 2, there is shown a group of the piezoelectric element 208, liquid channel, and ejection port 111. Further, a liquid inlet 209 for leading liquid into the liquid channel is formed so as to be opened on the rear surface of the actuator substrate 200 (the surface facing upward in the figure).

As shown in FIG. 2, the channel-forming substrate 110 is formed by bonding the third substrate 203 to the actuator substrate 200. Incidentally, the third substrate 203 contains silicon. The crystal orientation of the third substrate 203 is that of silicon (100). The actuator substrate 200 includes a first substrate 201 and a second substrate 202.

The first substrate 201 includes a first substrate member 204, a first bonding adhesive layer 205, a vibration film 206, and the piezoelectric element 208. Incidentally, the first substrate member 204 contains silicon. The crystal orientation of the first substrate member 204 is that of silicon (100). In the first substrate member 204, there are formed an accommodation space 207 accommodating the piezoelectric element 208 and a lead-in channel 210 into which liquid is led from the liquid inlet 209. The vibration film 206 is bonded to the first substrate member 204 with a bonding adhesive. Thus, the first bonding adhesive layer 205 is formed between the vibration film 206 and the first substrate member 204.

The piezoelectric element 208 is arranged on a vibration film forming layer (not shown) of the vibration film 206. The vibration film forming layer is formed by, for example, plasma-enhanced chemical vapor deposition (CVD). The piezoelectric element 208 includes a hydrogen barrier film (not shown) formed on the vibration film forming layer, a lower electrode (not shown) formed on the hydrogen barrier film, a piezoelectric film formed on the lower electrode, and an upper electrode (not shown) formed on the piezoelectric film. As the piezoelectric film, for example, a PZT (lead zirconate titanate) film formed by a sol-gel method or a sputtering method can be used. Such a piezoelectric element 208 includes a sintered body of a metal oxide crystal. The lower electrode and the upper electrode are formed by, for example, the sputtering method. The piezoelectric film is formed, for example, by the sol-gel method, but may also be formed by the sputtering method.

The second substrate 202 includes a second substrate member 211 and a first oxide film 213. Incidentally, the crystal orientation of the second substrate member 211 is that of silicon (100). In the second substrate member 211, there are formed a first groove 212 recessed from a bonding surface bonded to the third substrate 203 toward the opposite surface and a pressure chamber 214. The first oxide film 213 is formed in a position where the first oxide film 213 contacts the bottom of the first groove 212. Thus, the first oxide film 213 can be an etching stop layer for forming the first groove 212. The pressure chamber 214 is an opening formed so as to penetrate the second substrate member 211 with the second substrate 202 not bonded to the first substrate 201. That is, in the second substrate member 211, there is formed a hollow portion to be a liquid channel with the first substrate 201 and the second substrate 202 bonded to each other. The pressure chamber 214 is a channel having the vibration film 206 as a top wall and bringing the lead-in channel 210 and a lead-out channel 218 formed in the third substrate 203 into communication with each other with the second substrate 202 bonded so as to be sandwiched between the first substrate 201 and the third substrate 203.

The third substrate 203 includes a second oxide film 217 and a third oxide film 219. In the third substrate 203, there are formed a second groove 216 recessed from a bonding surface bonded to the second substrate member 211 toward the opposite surface, the lead-out channel 218 for leading out liquid to the ejection port 111, and the ejection port 111. Incidentally, the second groove 216 is formed on the back side in the figure from a position where the first groove 212 is formed and thus is shown by a dashed line. The second oxide film 217 is formed in a position where the second oxide film 213 contacts the bottom of the second groove 216. The second oxide film 217 thus can be an etching stop layer for forming the second groove 216. The third oxide film 219 can be an etching stop layer for forming the ejection port 111.

The third substrate 203 is bonded to the second substrate member 211 with a bonding adhesive, and the bonding adhesive may protrude in the case of bonding the third substrate 203 and the second substrate member 211 together. In the present embodiment, the first groove 212 is formed in the second substrate member 211 as described above. The second groove 216 is formed in the third substrate 203. Even in a case where a bonding adhesive protrudes in bonding the third substrate 203 and the second substrate member 211 together, such a configuration makes it possible to release the protruding bonding adhesive to the first groove 212, the second groove 216, or both of them.

Liquid Flow in the Channel-Forming Substrate 110

A description will be given below of a liquid flow in the channel-forming substrate 110 during liquid ejection by the print head 100 (see FIG. 1).

In the case of being ejected, liquid is supplied from the liquid inlet 209 to the pressure chamber 214 via the lead-in channel 210. With the first substrate 201 and the second substrate 202 bonded to each other, the vibration film 206 forming the top wall of the pressure chamber 214 has the property of being able to be deformed in a direction opposite to the pressure chamber 214.

Accordingly, in the pressure chamber 214, in a case where a drive voltage is applied to the piezoelectric element 208 from the electric wiring substrate 130 (see FIG. 1), the piezoelectric element 208 is deformed due to an inverse piezoelectric effect, and the vibration film 206 is also deformed in conjunction with the deformation of the piezoelectric element 208. This results in a change in the volume of the pressure chamber 214 and the liquid accommodated in the pressure chamber 214 is pressurized. That is, in the present embodiment, the vibration film 206 and the piezoelectric element 208 can be said to be piezoelectric actuators for providing energy for ejecting the liquid accommodated in the pressure chamber 214. The pressurized liquid is ejected as minute droplets from the ejection port 111 via the lead-out channel 218.

The brief description of the liquid flow in the channel-forming substrate 110 during liquid ejection has been made above.

Bonding Adhesive

A bonding adhesive that can be used in the present embodiment will be described below. As the bonding adhesive, a material having high adhesion to each substrate member is suitably used. It is preferable that a material for the bonding adhesive be a material low in the number of trapped air bubbles or the like and high in coating performance. Specifically, a low-viscosity material that can easily reduce the thicknesses of the first bonding adhesive layer 205 and the second bonding adhesive layer 215 is preferable.

The bonding adhesive preferably contains any resin selected from a group including an epoxy resin, an acrylic resin, a silicone resin, a benzocyclobutene resin, a polyamide resin, a polyimide resin, and an urethane resin.

Examples of a method of curing a bonding adhesive include a heat curing method and an ultraviolet delay curing method. Examples of a method of applying a bonding adhesive include a method of spin-coating a dry film with the bonding adhesive to transfer the bonding adhesive to one of substrates on an adhesion surface. For the bonding adhesive according to the present embodiment, benzocyclobutene, which is a thermosetting resin, can be suitably used. Since the viscosity of benzocyclobutene changes in accordance with the temperature, benzocyclobutene is easy to control. Benzocyclobutene has a region where the viscosity is about 10 to 100 poise during a time between bonding and curing. Thus, in a case where the second substrate 202 and the third substrate 203 are bonded to each other, a protruding bonding adhesive easily flows into the first groove 212, the second groove 216, or both of them.

It is preferable that the first bonding adhesive layer 205 and the second bonding adhesive layer 215 be formed thick in order to suppress voids during bonding. Specifically, it is preferable that the layers be formed so that a film thickness before bonding is 1.0 μm or more, preferably 2.0 μm, more preferably 5.0 μm or more. Voids can be suppressed by thickening the first bonding adhesive layer 205 and the second bonding adhesive layer 215.

However, in a case where an excessive bonding adhesive is applied, the bonding adhesive may protrude into a liquid channel such as the pressure chamber 214. In a case where the bonding adhesive protrudes into a liquid channel such as the pressure chamber 214, the bonding adhesive may clog the ejection port 111 or adhere to the vibration film 206. Such a situation can be a cause of affecting liquid ejection. Thus, it is desirable that the second substrate 202 and the third substrate 203 be bonded to each other so that no bonding adhesive protrudes into the pressure chamber 214 or the like.

Suppression of Protrusion of a Bonding Adhesive

Figure 3A:
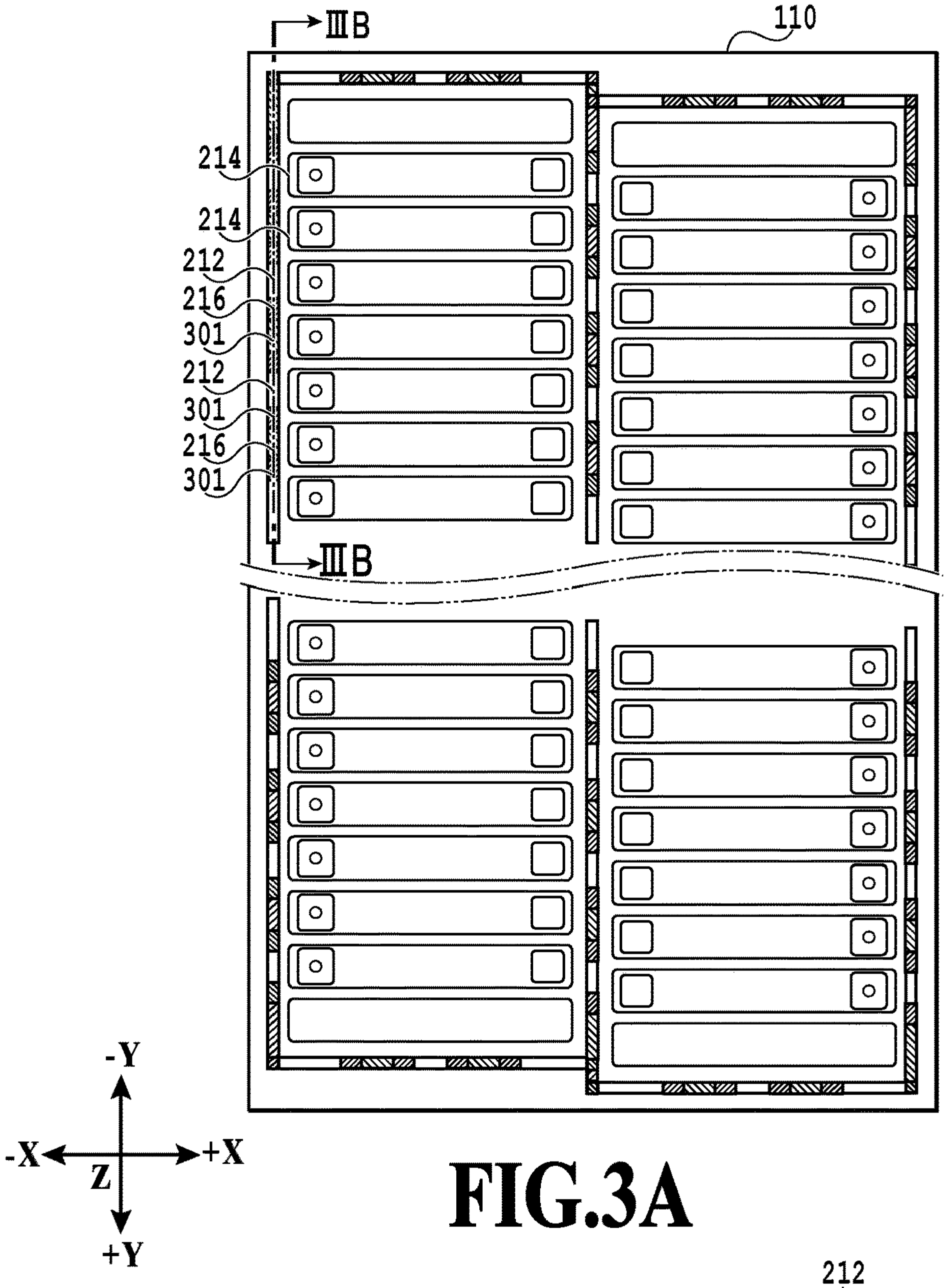
FIGS. 3A and 3B are schematic diagrams of an example of an arrangement of grooves according to one embodiment.
Figure 3B:
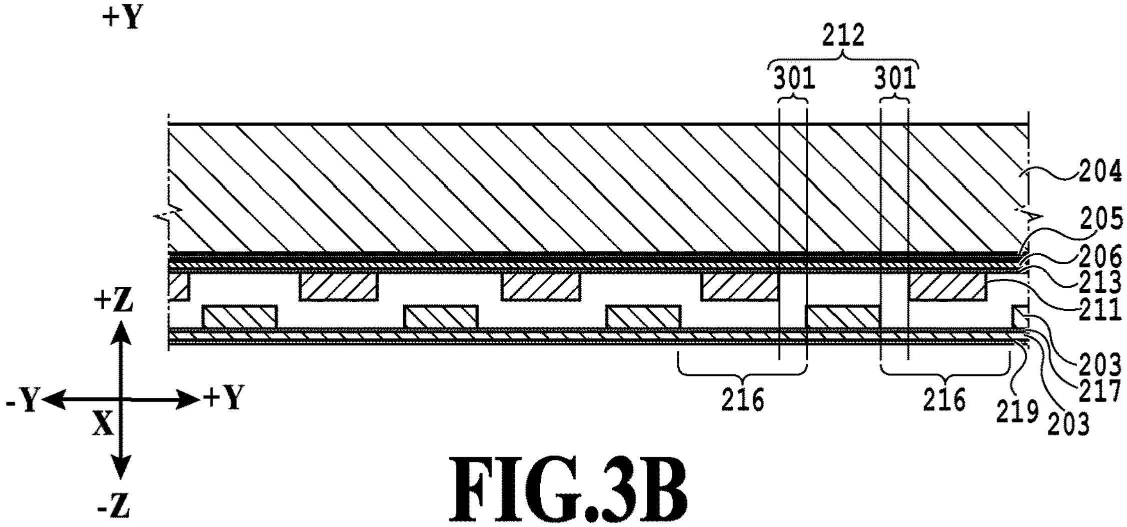

FIGS. 3A and 3B are schematic diagrams showing an example of an arrangement of grooves according to the present embodiment. FIG. 3A is a schematic plan view in a case where the channel-forming substrate 110 is seen through. FIG. 3B is a cross-sectional view taken along line IIIb-IIIb in FIG. 3A.

As already described with reference to FIG. 2, in the second substrate member 211, for example, the pressure chamber 214 is formed as a hollow portion to be a liquid channel. The third substrate 203 is bonded to the actuator substrate 200 including the second substrate member 211 with a bonding adhesive.

As shown in FIGS. 3A and 3B, in the second substrate member 211, the plurality of first grooves 212 are intermittently formed on the bonding surface bonded to the third substrate 203. In the third substrate 203, the plurality of second grooves 216 are intermittently formed on the bonding surface bonded to the second substrate member 211. In a case where the channel-forming substrate 110 is viewed from above, the first grooves 212 and the second grooves 216 are alternately arranged so as to surround the pressure chamber 214 as a hollow portion.

In the present embodiment, two of the second grooves 216 are communicated with one of the first grooves 212. In the present embodiment, the plurality of first grooves 212 and the plurality of second grooves 216 are arranged at intervals of 25 μm or less. Such a configuration makes it possible to suppress protrusion of a bonding adhesive into a liquid channel such as the pressure chamber 214 while suppressing a decrease in the rigidity of the channel-forming substrate 110. That is, in the present embodiment, the protrusion of a bonding adhesive can be suppressed to substantially the same extent as in a case where one groove is continuously formed on one side by the first groove 212 formed on an upper surface side and the second groove 216 formed on a lower surface side being communicated with each other.

Simulation Result

Figure 4A:
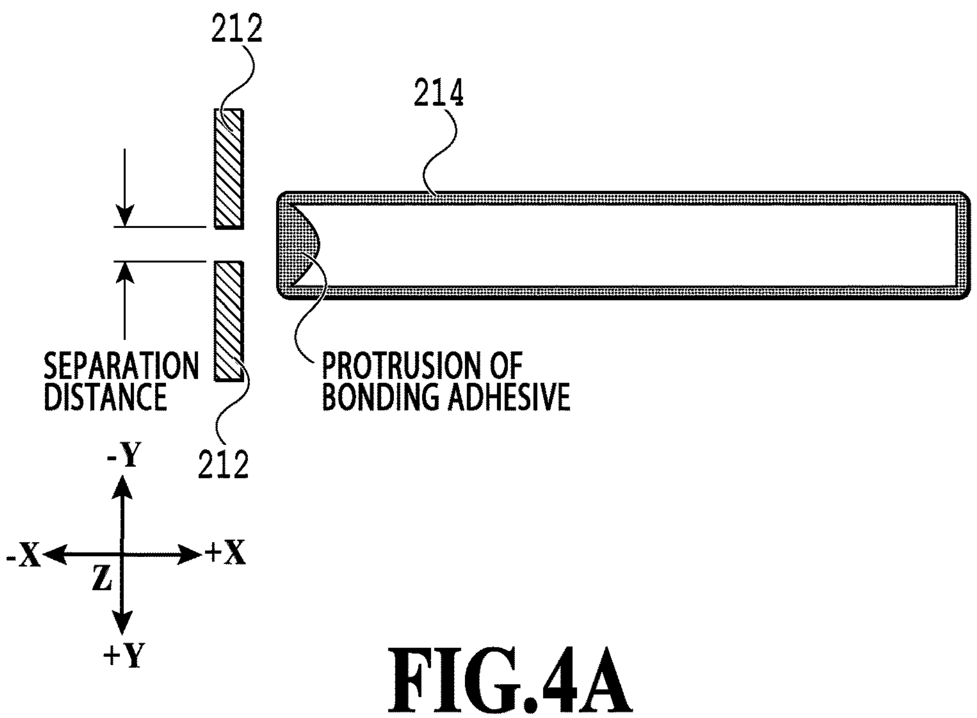
FIGS. 4A and 4B are diagrams for explaining a relationship between a separation distance between two grooves and the amount of protruding bonding adhesives.
Figure 4B:
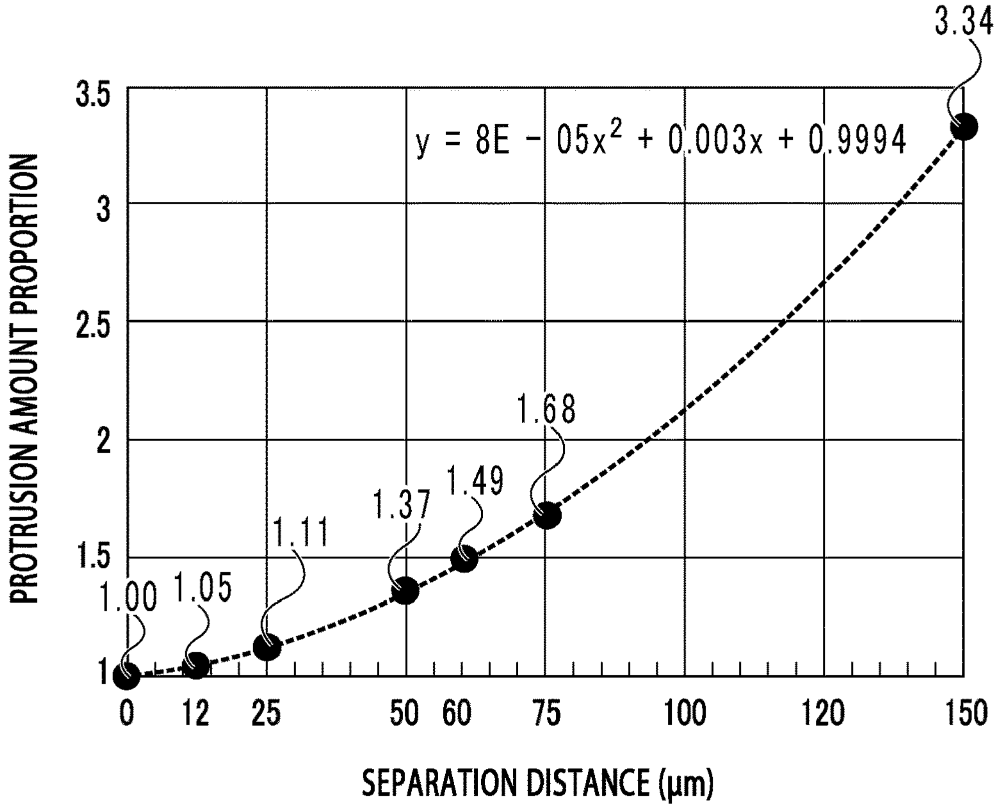

FIGS. 4A and 4B are diagrams for explaining a relationship between a separation distance between two grooves and the amount of protruding bonding adhesives. FIG. 4A is a diagram schematically showing the adjacent two of the first grooves 212 and a bonding adhesive protruding into the pressure chamber 214. FIG. 4B is a graph showing a simulation result obtained by comparing the amount of protruding bonding adhesives for each separation distance between two grooves adjacent to each other. In the present example, a description will be given on the assumption that the plurality of first grooves 212 are separated from each other and formed in the second substrate member 211 and a bonding adhesive protrudes into the pressure chamber 214.

As shown in FIG. 4B, in a case where a separation distance between two grooves is “0 (zero),” the amount of protruding bonding adhesives is the smallest. That is, it is essentially possible to suppress protrusion of a bonding adhesive by forming a groove continuously rather than forming grooves intermittently.

In contrast, as the separation distance between two grooves increases, a protrusion amount tends to increase exponentially. It can be seen from FIG. 4B that in a case where an interval at which the plurality of first grooves 212 are arranged (that is, the separation distance) is 60 μm or less, the protrusion amount can be suppressed to less than 1.5 times that in a case where the separation distance is 0 (zero). Accordingly, the separation distance between the adjacent two of the first grooves 212 is preferably 60 μm or less. More preferably, the separation distance between the adjacent two of the first grooves 212 is preferably 50 μm or less. More preferably, the separation distance between the adjacent two of the first grooves 212 is preferably 25 μm or less. Most preferably, the separation distance between the adjacent two of the first grooves 212 is 12 μm or less.

As described above, from the viewpoint of bringing the amount of protruding bonding adhesives closer to “0 (zero),” it is preferable to form one groove continuously rather than forming a plurality of grooves intermittently. However, forming one groove continuously may decrease rigidity. In the present embodiment, thus, a plurality of grooves are intermittently formed so that the separation distance between two adjacent grooves is as small as possible. In the present example, by setting the separation distance between the adjacent two of the first grooves 212 to 12 μm or less, even in a case where two of the first grooves 212 are separated, the amount of protruding bonding adhesives can be kept to an about 5% increase as compared with that in a case where a groove is formed continuously.

Comparative Example

To facilitate understanding of the effect of the channel-forming substrate 110 according to the present embodiment suppressing protrusion of a bonding adhesive while maintaining rigidity, a description will be given below by showing an example in which one groove is continuously formed.

Figure 5A:
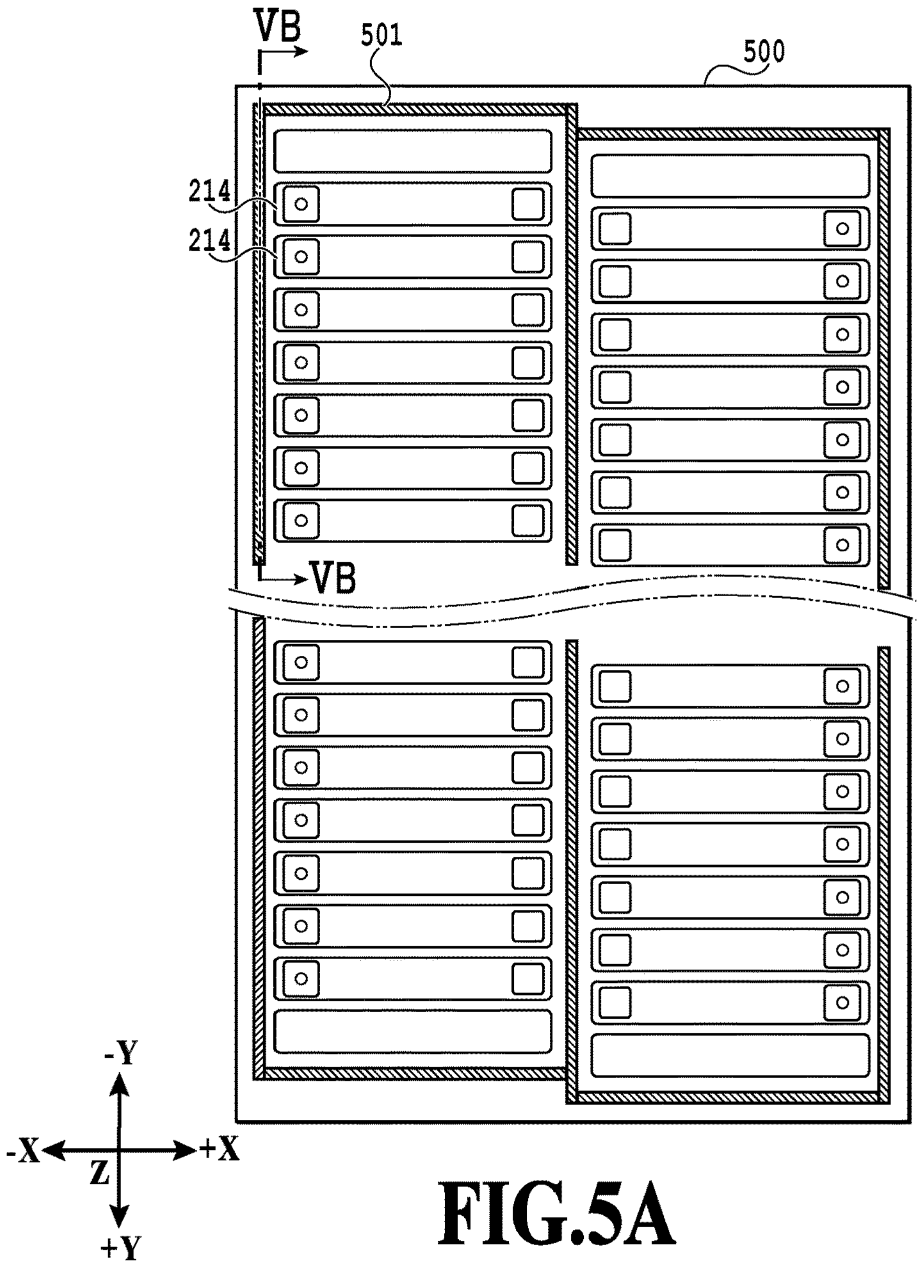
FIGS. 5A and 5B are schematic diagrams showing an example of an arrangement of grooves in a comparative example.
Figure 5B:
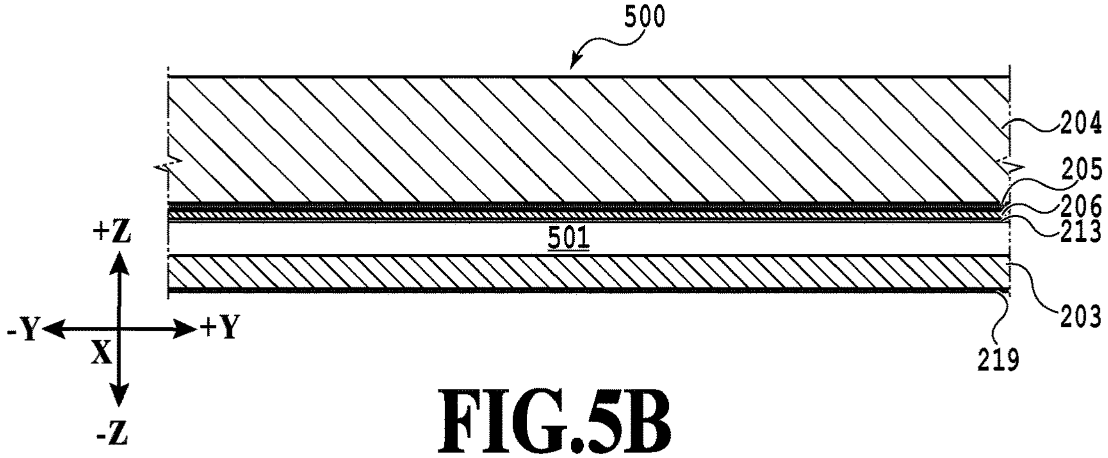

FIGS. 5A and 5B are schematic diagrams showing an example of an arrangement of grooves in a comparative example. Incidentally, FIGS. 5A and 5B correspond to the examples in FIGS. 3A and 3B. The same reference numeral as in the present embodiment is used for the same constituent as that of the channel-forming substrate 110 according to the present embodiment, and the description thereof is omitted as appropriate. FIG. 5A is a schematic plan view in a case where a channel-forming substrate 500 in the comparative example is seen through. FIG. 5B is a cross-sectional view taken along line Vb-Vb in FIG. 5A.

As shown in FIGS. 5A and 5B, in the second substrate member 211 of the channel-forming substrate 500, a groove 501 is continuously formed so as to surround a plurality of pressure chambers 214 in which the same type of liquid flows. However, no groove is formed in the third substrate 203 of the channel-forming substrate 500. In the channel-forming substrate 500, it is possible to suppress protrusion of a bonding adhesive in the case of bonding the second substrate member 211 and the third substrate 203 together. On the other hand, the channel-forming substrate 500 has lower rigidity than that of the channel-forming substrate 110 and was damaged during a manufacturing step.

The description of the effect of the channel-forming substrate 110 according to the present embodiment suppressing protrusion of a bonding adhesive while maintaining rigidity has been given above.

Method of Manufacturing a Substrate

FIGS. 6A to 6D to FIGS. 14A and 14B are diagrams for explaining a step of manufacturing the channel-forming substrate 110 according to the present embodiment. Hereinafter, an attention will be focused on a portion where a protruding bonding adhesive is released to a groove in a case where the second substrate member 211 and the third substrate 203 are bonded to each other, and a description of a configuration in which a constituent other than the groove is formed will be omitted as appropriate.

Figure 6A:
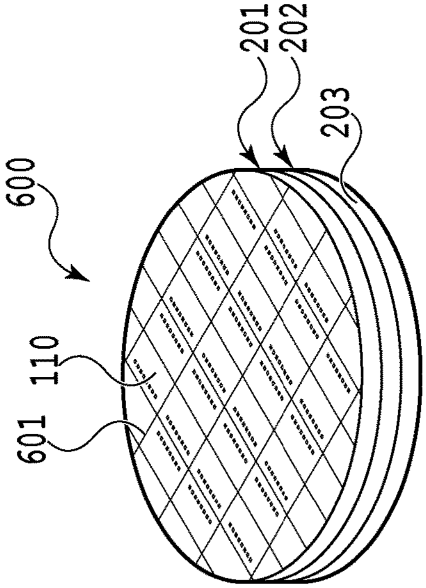
FIGS. 6A to 6D are schematic diagrams of a wafer according to one embodiment.
Figure 6B:
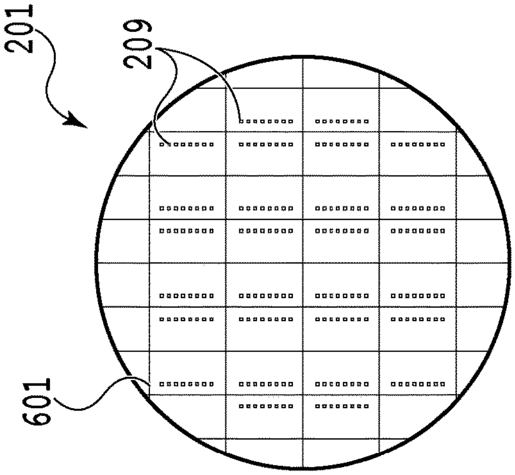
Figure 6C:
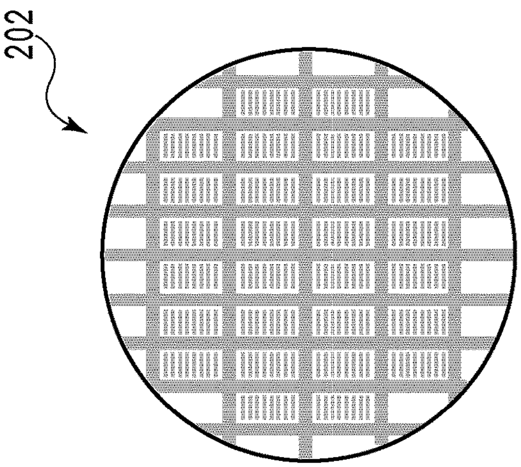
Figure 6D:
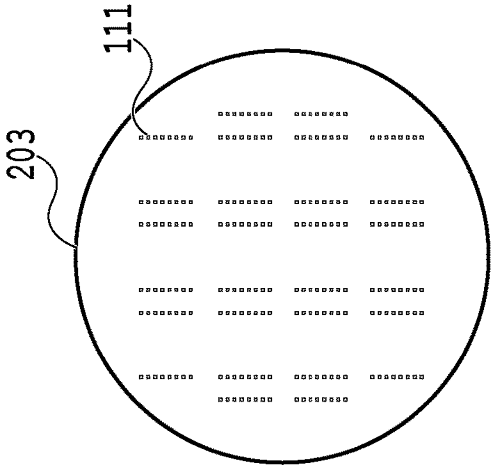

FIGS. 6A to 6D are schematic diagrams of a plurality of substrates that constitute a wafer 600 and the channel-forming substrate 110 in a wafer state according to the present embodiment. FIG. 6A is a schematic external perspective view of the wafer 600 before the channel-forming substrate 110 is divided into individual pieces according to the present embodiment. FIG. 6B is a schematic plan view of the wafer 600. FIG. 6C is a schematic plan view of the second substrate 202 in a case where the wafer 600 is seen through. FIG. 6D is a schematic bottom view of the wafer 600.

As shown in FIG. 6A, the channel-forming substrate 110 according to the present embodiment is manufactured by dicing along a scribe line 601 the wafer 600 in which the first substrate 201, the second substrate 202, and the third substrate 203 are laminated and bonded. Incidentally, a plurality of individual pieces of the divided channel-forming substrate 110 are cut out from one wafer 600 by dicing the wafer 600 along the scribe line 601.

First, a precondition for a method of manufacturing the channel-forming substrate 110 will be described. In the present disclosure, steps that are not specifically described are performed through general substrate processing steps. For example, in a description of the step of manufacturing the channel-forming substrate 110 including a silicon substrate, manufacturing steps that are not specifically described are general steps of manufacturing a semiconductor. For example, in a case where the channel-forming substrate 110 is a Si (silicon) substrate, the channel-forming substrate 110 can be manufactured by forming a desired etching mask on a surface of the wafer 600 and then performing Si dry etching. The etching mask can be formed by using, for example, a novolac-based photoresist and performing exposure, developing, and patterning. As an example of a Si dry etching technique, an etching technique referred to as the so-called Bosch Process can be used. In the Bosch Process, $SF_6$ gas (sulfur hexafluoride gas) is used in an etching process, and $C_4F_8$ gas (cyclobutane octafluoride gas) is used in a coating process. A general technique can be used for Si wet etching. For example, it is possible to use a technique in which after forming a film of $SiO_2$ (silicon dioxide) on the wafer 600 and patterning the $SiO_2$ with an etching mask such as a resist, an aqueous solution of KOH (potassium hydroxide) having a temperature of 80° C. and a concentration of 20% is used.

Figure 7A:
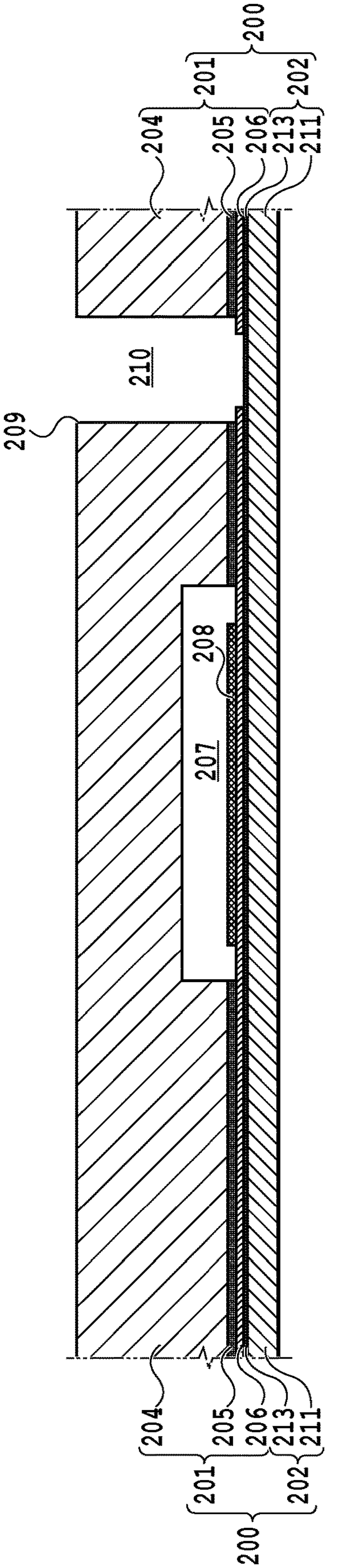
FIGS. 7A and 7B are diagrams showing an example of a step of manufacturing the channel-forming substrate according to one embodiment.
Figure 7B:
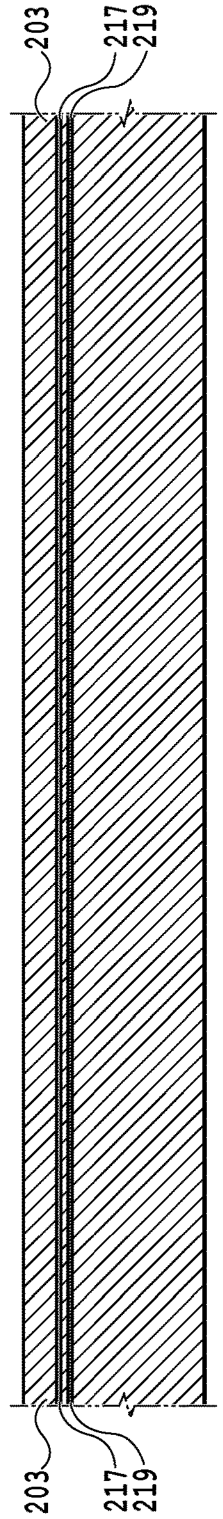

FIGS. 7A and 7B are diagrams showing an example of a first step of manufacturing the channel-forming substrate 110 according to the present embodiment. FIG. 7A is a diagram showing an example of the actuator substrate 200 before the first groove 212 and the pressure chamber 214 are formed in the second substrate member 211. Incidentally, the accommodation space 207, the vibration film 206, the piezoelectric element 208, the liquid inlet 209, and the lead-in channel 210 are already formed in the actuator substrate 200 shown in FIG. 7A. FIG. 7B is a diagram showing an example of the third substrate 203 before the second groove 216 is formed. As shown in FIGS. 7A and 7B, the actuator substrate 200 and the third substrate 203 are prepared in the first step.

Figure 8A:
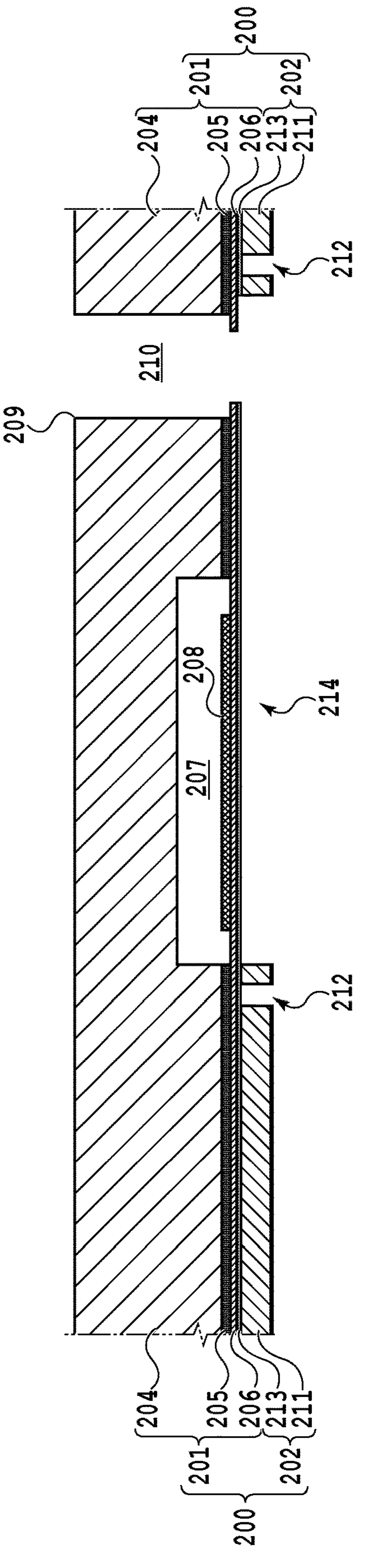
FIGS. 8A and 8B are diagrams showing an example of a step of forming the grooves in a substrate according to one embodiment.
Figure 8B:
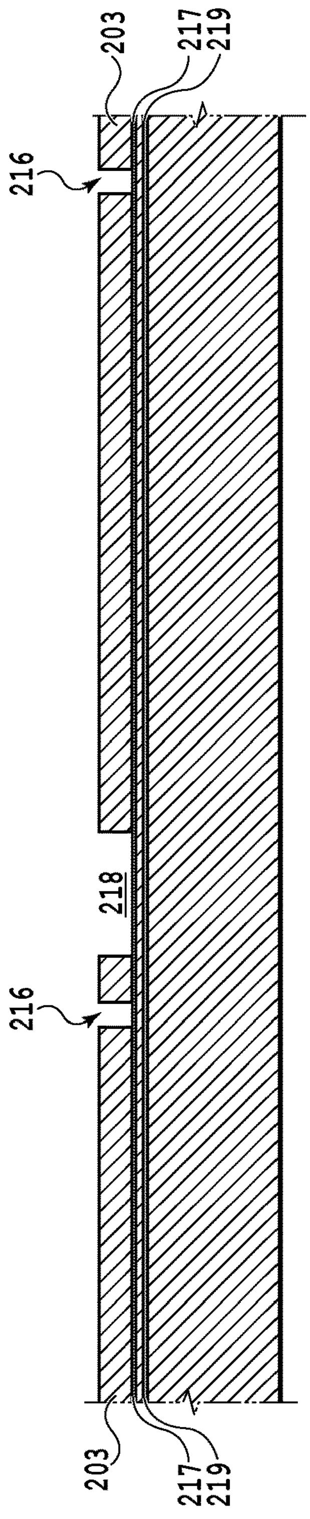

FIGS. 8A and 8B are diagrams showing an example of a second step of forming a groove in a substrate according to the present embodiment. FIG. 8A is a diagram showing an example of a step of forming the first groove 212 and the pressure chamber 214 in the second substrate member 211 according to the present embodiment.

As shown in FIG. 8A, the first groove 212 and the pressure chamber 214 are formed in the second substrate member 211 in the second step. Since the first oxide film 213 is included in the second substrate member 211, in forming the first groove 212, etching can be performed sufficiently to a depth at which the first oxide film 213 is reached regardless of the size of the first groove 212. Forming the first groove 212 sufficiently deep as described above increases the amount of bonding adhesives that can be released and thus is preferable. Incidentally, the first oxide film 213 may be removed after the first groove 212 is formed.

FIG. 8B is a diagram showing an example of a third step of forming the second groove 216 and the lead-out channel 218 in the third substrate 203. As shown in FIG. 8B, the second groove 216 and the lead-out channel 218 are formed in the third substrate 203 in the third step. Since the second oxide film 217 is included in the third substrate 203, in forming the second groove 216, etching can be performed to a depth at which the second oxide film 217 is reached regardless of the size of the second groove 216. Forming the second groove 216 sufficiently deep as described above increases the amount of bonding adhesives that can be released and thus is preferable. Incidentally, the second oxide film 217 may be removed after the second groove 216 is formed.

Figure 9A:
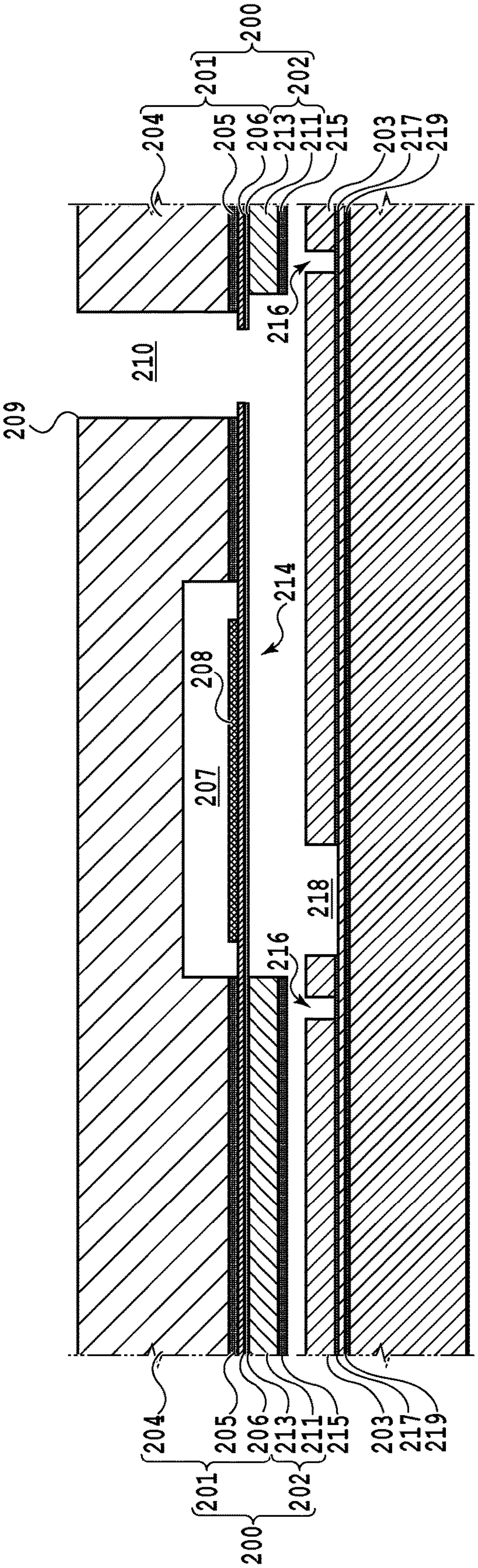
FIGS. 9A and 9B are diagrams showing an example of a step of applying a bonding adhesive to a second substrate member according to one embodiment.
Figure 9B:
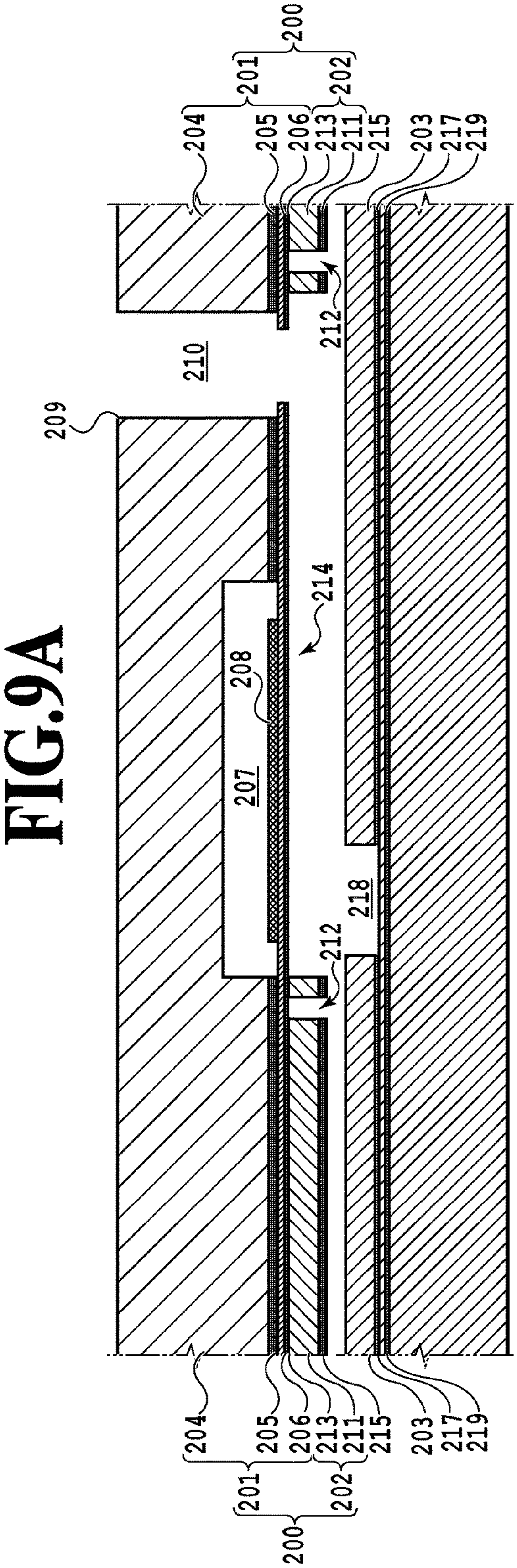

FIGS. 9A and 9B are diagrams showing an example of a fourth step of applying a bonding adhesive to the second substrate member 211 according to the present embodiment. FIG. 9A is a schematic cross-sectional view showing a cross section of the second substrate member 211 including a surface facing the second groove 216. As shown in FIG. 9A, a bonding adhesive is applied to the second substrate member 211 in the fourth step. In the present embodiment, a bonding adhesive is applied by transfer to a surface facing the second groove 216 formed in the third substrate 203. As a result, the second bonding adhesive layer 215 is formed. FIG. 9B is a schematic cross-sectional view showing a cross section of the second substrate member 211 that does not include the surface facing the second groove 216. That is, FIG. 9B is a schematic cross-sectional view of a region, where the first groove 212 is formed, of the second substrate member 211. As shown in FIG. 9B, in the fourth step, no bonding adhesive is applied to the region, where the first groove 212 is formed, of the second substrate member 211 or a region to be the pressure chamber 214.

Figure 10A:
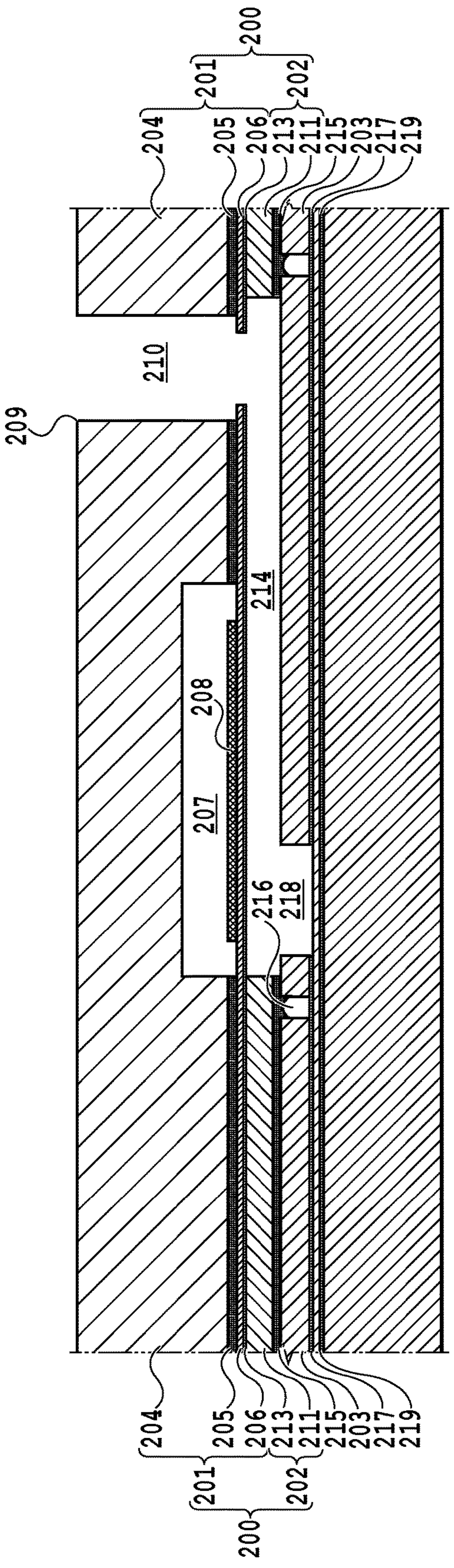
FIGS. 10A and 10B are diagrams showing an example of a step of bonding the second substrate member and a third substrate together according to one embodiment.
Figure 10B:
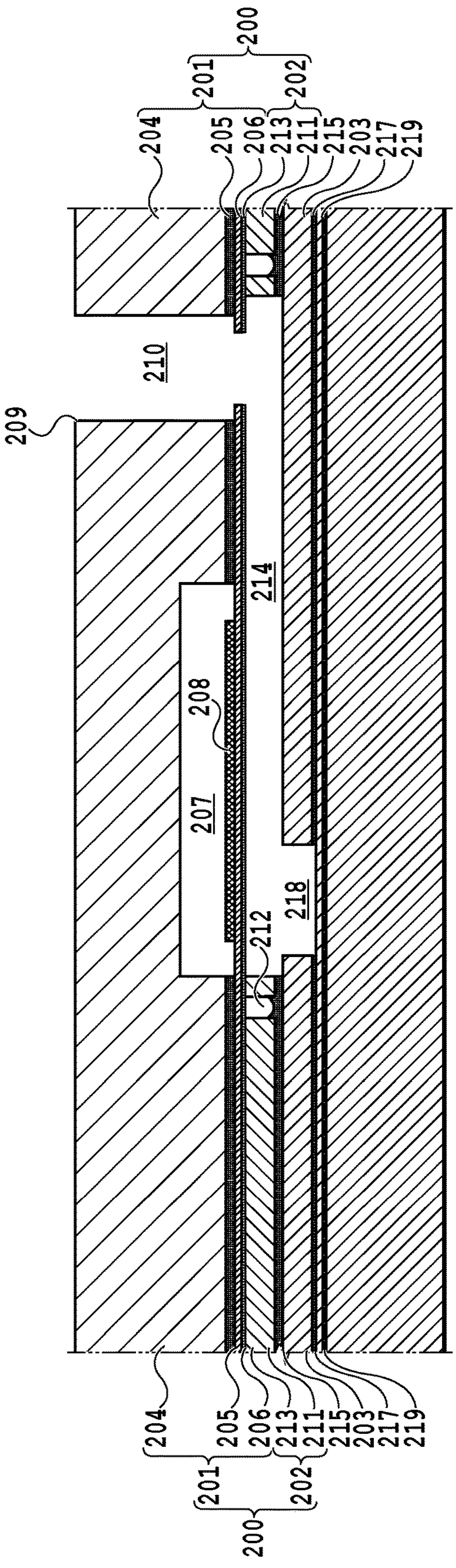

FIGS. 10A and 10B are diagrams showing an example of a fifth step of bonding the second substrate member 211 and the third substrate 203 according to the present embodiment together. FIG. 10A is a diagram showing an example in which a bonding adhesive protrudes into the second groove 216 in a case where the second substrate member 211 and the third substrate 203 according to the present embodiment are bonded to each other. FIG. 10B is a diagram showing an example in which a bonding adhesive protrudes into the first groove 212 in a case where the second substrate member 211 and the third substrate 203 according to the present embodiment are bonded to each other.

As already described with reference to FIG. 3B, in the fifth step, the second substrate member 211 and the third substrate 203 are bonded to each other so that the first groove 212 and the second groove 216 are communicated with each other. In bonding the second substrate member 211 and the third substrate 203 together, in a case where an excessive bonding adhesive is applied to the second substrate member 211, as shown in FIGS. 10A and 10B, the bonding adhesive may protrudes into the first groove 212, the second groove 216, or both of them.

However, even in a case where a bonding adhesive protrudes into the second substrate member 211, such a configuration makes it possible to release the bonding adhesive to the first groove 212, the second groove 216, or both of them. This makes it possible to suppress the protruding bonding adhesive flowing into a liquid channel such as the pressure chamber 214.

Figure 11:
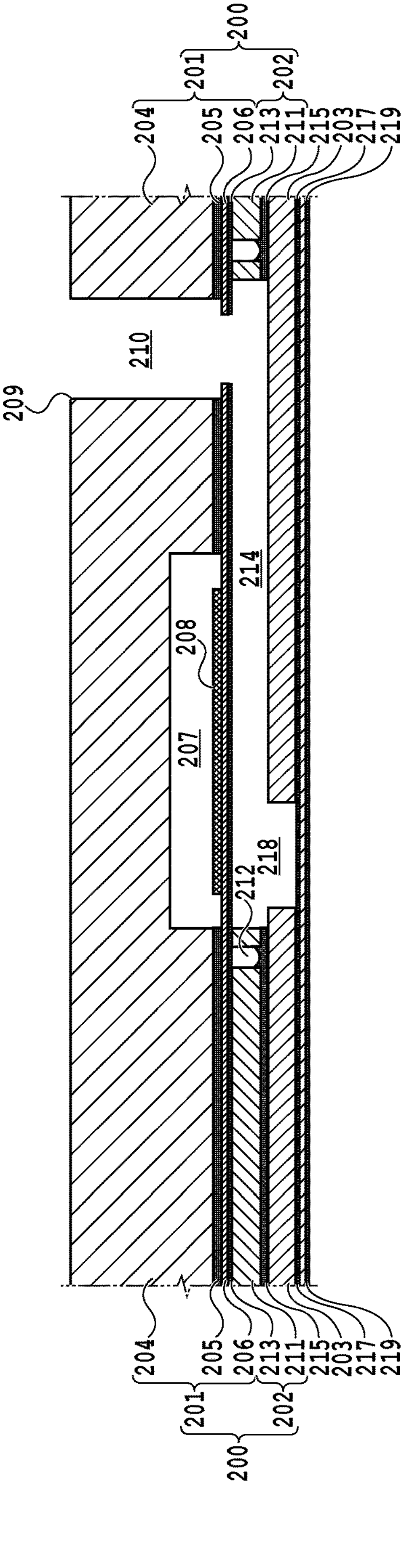
FIG. 11 is a diagram showing an example of a step of thinning the third substrate according to one embodiment.

FIG. 11 is a diagram showing an example of a sixth step of thinning the third substrate 203 according to the present embodiment. As shown in FIG. 11, in the sixth step, the third substrate 203 is thinned with the second substrate member 211 and the third substrate 203 bonded to each other.

Figure 12:
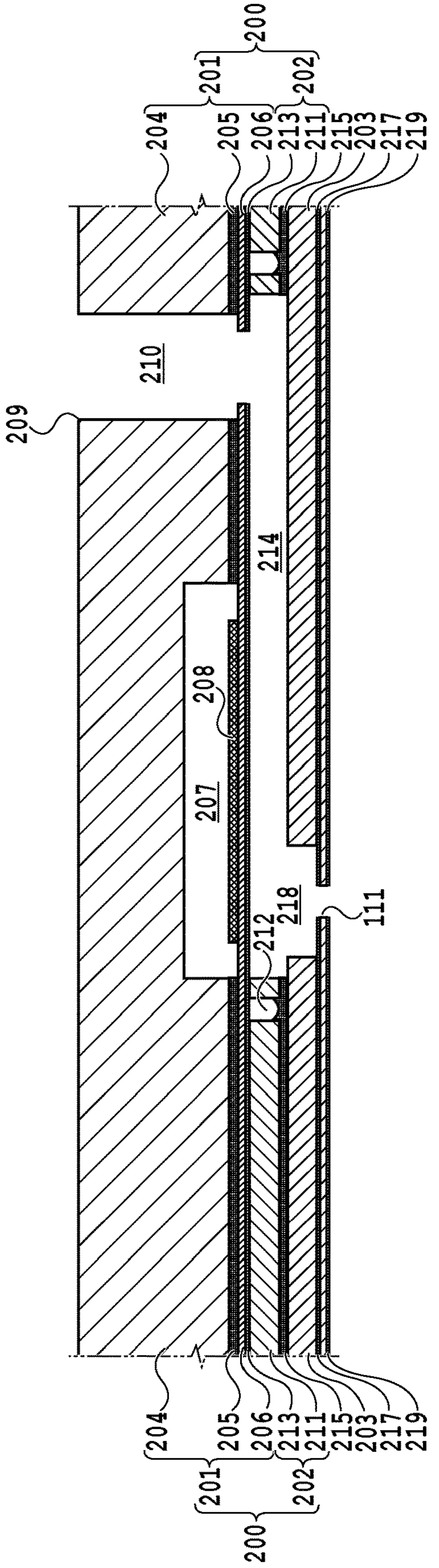
FIG. 12 is a diagram showing an example of a step of forming an ejection port according to one embodiment.

FIG. 12 is a diagram showing an example of a seventh step of forming the ejection port 111 according to the present embodiment. As shown in FIG. 12, in the seventh step, the ejection port 111 is formed in the thinned third substrate 203. Incidentally, the third oxide film 219 may be removed after the ejection port 111 is formed.

Finally, in an eighth step, the wafer 600 (see FIGS. 6A to 6D) is diced along the scribe line 601. That is, the actuator substrate 200 including the second substrate member 211 and the third substrate 203 are cut while being bonded to each other and divided into a plurality of individual pieces of the channel-forming substrate 110. As a result, the channel-forming substrate 110 divided into individual pieces can be obtained.

A series of steps for manufacturing the channel-forming substrate 110 is thus completed.

CONCLUSION

As described above, in the case of using the channel-forming substrate 110 according to the present embodiment, the plurality of first grooves 212 are formed intermittently in the second substrate member 211 so as to surround a liquid channel such as a plurality of pressure chambers 214 in which the same type of liquid flows. On the other hand, the plurality of second grooves 216 are formed intermittently in the third substrate 203 so as to surround the liquid channels which are the pressure chambers 214 with the second substrate member 211 and the third substrate 203 bonded to each other.

In manufacturing the channel-forming substrate 110, the second substrate member 211 and the third substrate 203 are then bonded to each other so that the first groove 212 and the second groove 216 are communicated with each other. As a result, one groove formed continuously is substantially formed in the entire channel-forming substrate 110.

Thus, the technique according to the present disclosure makes it possible to provide a channel-forming substrate capable of suppressing protrusion of a bonding adhesive while maintaining rigidity.

Further, the print head 100 to which the channel-forming substrate 110 according to the present embodiment is attached makes it possible to ensure the rigidity of the channel-forming substrate 110 and suppress inhibition of a liquid flow in the channel-forming substrate 110 by a protruding bonding adhesive.

Thus, the print head 100 according to the present embodiment makes it possible to perform printing while ejecting liquid stably.

Second Embodiment

A second embodiment in the technique according to the present disclosure will be described below with reference to the drawings. In the following description, the same reference numeral and name are used for a constituent identical to or corresponding to that in the first embodiment, descriptions thereof are omitted as appropriate, and differences are mainly described.

The present embodiment aims to further increase the rigidity of the channel-forming substrate 110 as compared with that in the first embodiment. Further, in the first embodiment, the separation distance in FIG. 2 indicates the separation distance between the adjacent two of the first grooves 212. On the other hand, the present embodiment is different from the first embodiment in that in the present embodiment, the "separation distance" in FIG. 2 indicates the separation distance between the first groove 212 and the second groove 216 that are not communicated with each other.

Figure 13A:
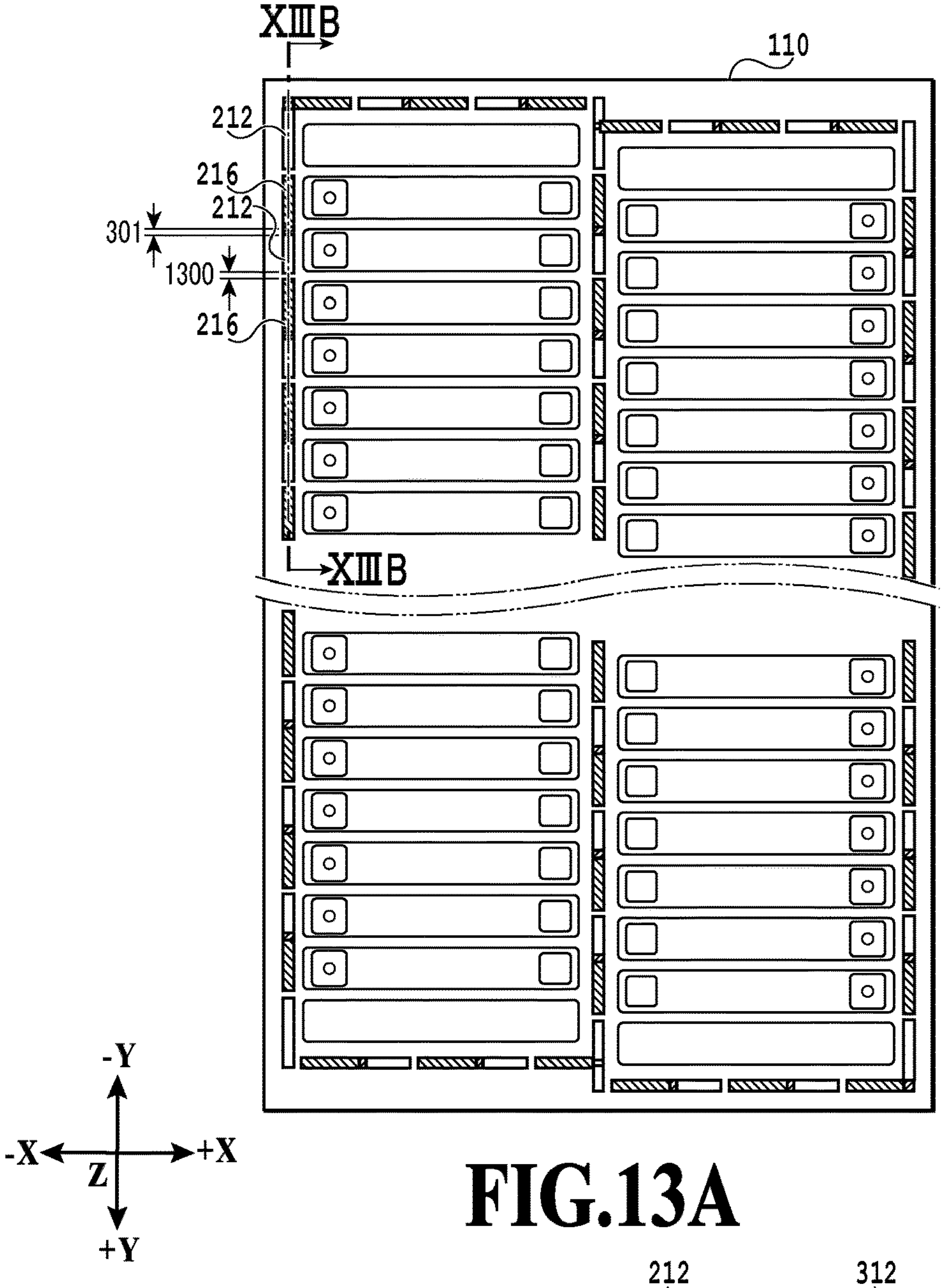
FIGS. 13A and 13B are schematic diagrams showing an example of an arrangement of the grooves according to one embodiment.
Figure 13B:
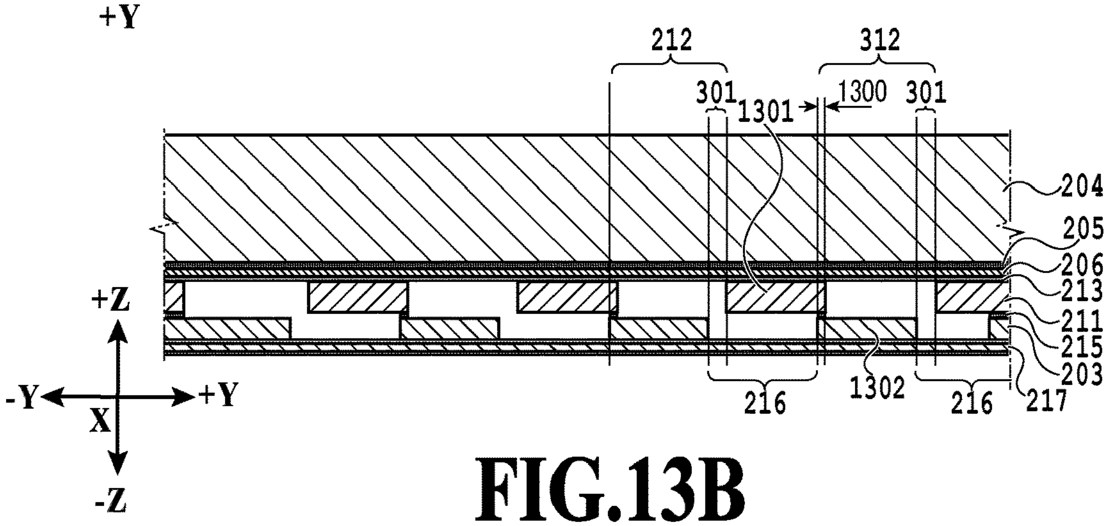

FIGS. 13A and 13B are schematic diagrams showing an example of an arrangement of grooves according to the present embodiment. FIG. 13A is a schematic plan view in a case where the channel-forming substrate 110 according to the present embodiment is seen through. FIG. 13B is a cross-sectional view taken along line XIIIb-XIIIb in FIG. 13A.

As shown in FIG. 13A, the channel-forming substrate 110 according to the present embodiment has a bonding region 1300 where the first groove 212 and the second groove 216 are not communicated with each other in a state where the channel-forming substrate 110 is viewed from above.

As shown in FIG. 13B, in the present embodiment, one of the second grooves 216 is communicated with one of the first grooves 212 via one communication portion 301 with the second substrate member 211 and the third substrate 203 bonded to each other. That is, in the present embodiment, the bonding region 1300 exists for bonding a portion of a first convex portion 1301 located between the adjacent two of the first grooves 212 and a portion of a second convex portion 1302 located between the adjacent two of the second grooves 216.

Here, in the present embodiment, FIGS. 4A and 4B are referred to on the assumption that the first groove 212 and the second groove 216 are separated with the bonding region 1300 interposed therebetween. In this case, it can be understood from FIGS. 4A and 4B that in a case where the separation distance between the first groove 212 and the second groove 216 is 60 μm or less, the protrusion amount can be less than 1.5 times that in a case where the separation distance is 0 (zero). That is, in the present embodiment, in a case where the length of the bonding region 1300 in the right-and-left direction in FIG. 13B is 60 μm or less, the protrusion amount can be less than 1.5 times that in the first embodiment in which every first groove 212 and every second groove 216 are formed so as to be communicated with each other.

Accordingly, in the present embodiment, in order to reduce the protrusion amount to less than 1.5 times that in the first embodiment, the first groove 212 and the second groove 216 need to be arranged so that the length of the bonding region 1300 in the up-and-down direction in FIG. 13A is 60 μm or less. For example, it is preferable that the first groove 212 and the second groove 216 that are adjacent to each other be arranged so as not to be communicated with each other via a bonding region with a length of 50 μm or less. Specifically, it is preferable that the first groove 212 and the second groove 216 be arranged so that the length of the bonding region 1300 in the up-and-down direction in FIG. 13A is 50 μm or less.

More preferably, it is preferable that the first groove 212 and the second groove 216 be arranged so that the length of the bonding region 1300 in the up-and-down direction in FIG. 13A is 25 μm or less. Further preferably, it is preferable that the first groove 212 and the second groove 216 be arranged so that the length of the bonding region 1300 in the up-and-down direction in FIG. 13A is 12 μm or less. That is, the smaller the length of the bonding region 1300 in the up-and-down direction in FIG. 13A is, the more the amount of protruding bonding adhesives can be suppressed.

For example, in a case where the first groove 212 and the second groove 216 are arranged so that the length of the bonding region 1300 in the up-and-down direction in FIG. 13A is less than 12 μm, the protrusion amount can be suppressed to less than 1.05 times that in the first embodiment. That is, in a case where the length of the bonding region 1300 in the up-and-down direction in FIG. 13A is less than 12 μm, the amount of protruding bonding adhesives can be suppressed to an about 5% increase as compared with that in the example in which every first groove 212 and every second groove 216 are communicated with each other.

Therefore, the print element substrate according to the present embodiment makes it possible to suppress protrusion of a bonding adhesive while further increasing rigidity.

Third Embodiment

A third embodiment in the technique according to the present disclosure will be described below with reference to the drawings. In the following description, the same reference numeral and name are used for a constituent identical to or corresponding to that in the first embodiment or the second embodiment, descriptions thereof are omitted as appropriate, and differences are mainly described.

The present embodiment aims to further increase the rigidity of the channel-forming substrate 110 as compared with that in the above embodiments. In the present embodiment, as in the second embodiment, the "separation distance" in FIGS. 4A and 4B indicates the separation distance between the first groove 212 and the second groove 216 that are not communicated with each other.

Figure 14A:
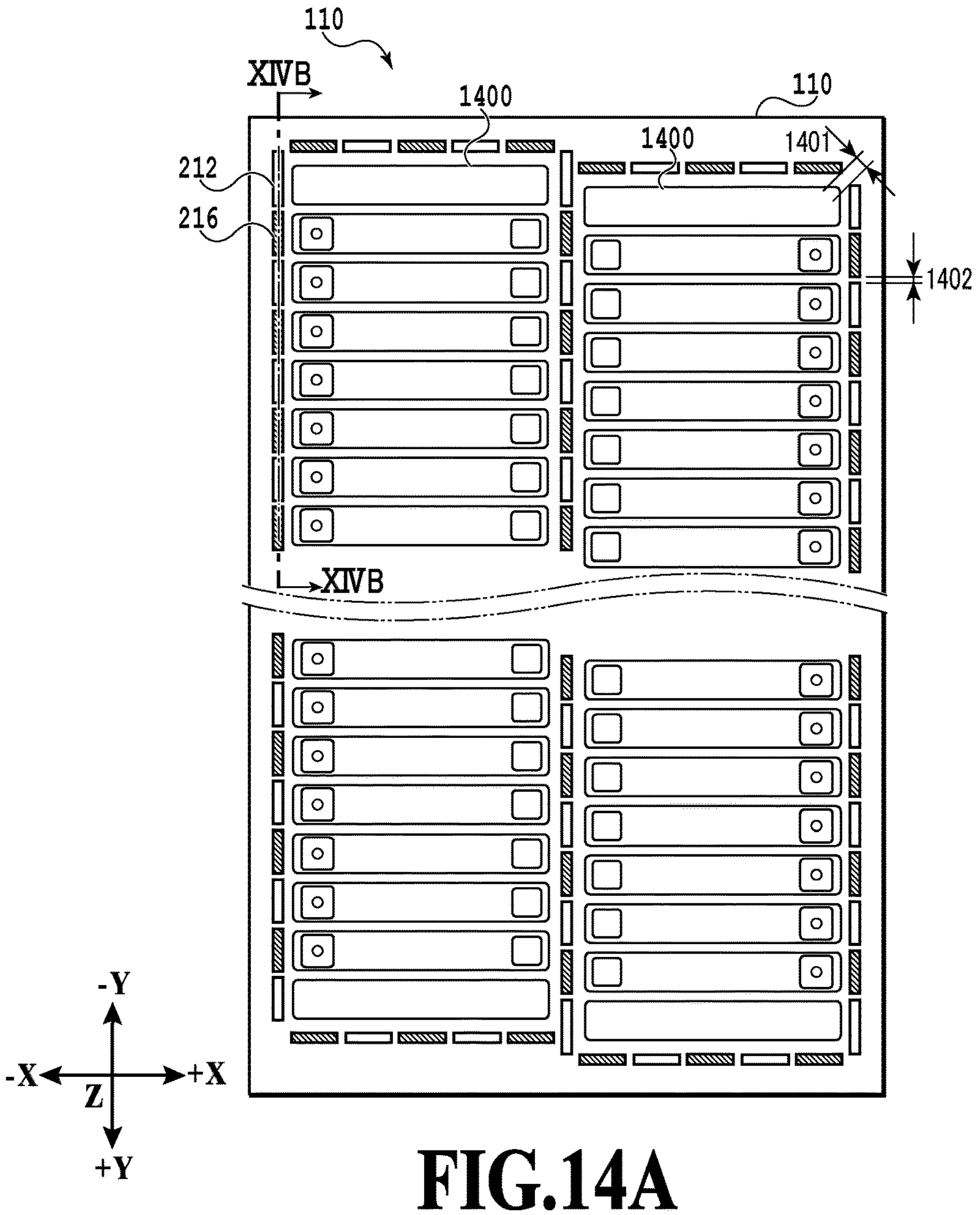
FIGS. 14A and 14B are schematic diagrams showing an example of an arrangement of the grooves according to one embodiment.
Figure 14B:
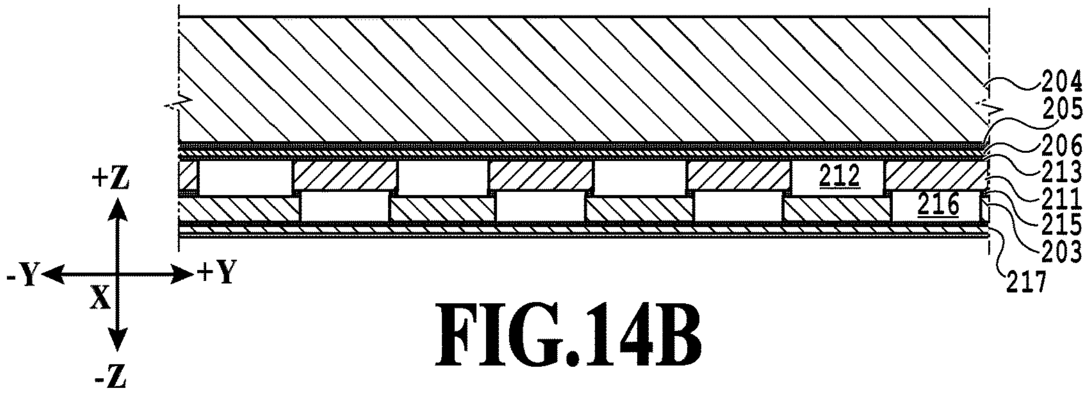

FIGS. 14A and 14B are schematic diagrams showing an example of an arrangement of grooves according to the present embodiment. FIG. 14A is a schematic plan view in a case where the channel-forming substrate 110 according to the present embodiment is seen through. As shown in FIG. 14A, in the present embodiment, none of the first grooves 212 and none of the second grooves 216 are communicated with each other.

Further, the second substrate member 211 according to the present embodiment is provided with the pressure chamber 214 for ejecting liquid and a non-ejection opening 1400 having the same shape as that of the pressure chamber 214 and not involved in liquid ejection. Around the non-ejection opening 1400, the separation distance between the first groove 212 and the second groove 216 in a case where the channel-forming substrate 110 is viewed from above may be larger than in a region other than that around the non-ejection opening 1400.

For example, in a separation portion 1401 at a corner of the non-ejection opening 1400, the first groove 212 and the second groove 216 are arranged so that the separation distance between the first groove 212 and the second groove 216 is larger than in a separation portion 1402 other than the non-ejection opening 1400. With such a configuration, an adhesion surface area between the second substrate member 211 and the third substrate 203 in the separation portion 1401 is larger than an adhesion surface area between the second substrate member 211 and the third substrate 203 in the separation portion 1402.

FIG. 14B is a cross-sectional view taken along line XIVb-XIVb in FIG. 14A. As shown in FIG. 14B, in the present embodiment, the first groove 212 and the second groove 216 are not communicated with each other with the second substrate member 211 and the third substrate 203 bonded to each other. With such a configuration, the adhesion surface area between the second substrate member 211 and the third substrate 203 is larger than that in a case where the first groove 212 and the second groove 216 are communicated with each other.

Thus, the rigidity of the channel-forming substrate 110 according to the present embodiment can be increased as compared with that in the first embodiment and the second embodiment.

Fourth Embodiment

A fourth embodiment in the technique according to the present disclosure will be described below with reference to the drawings. In the following description, the same reference numeral and name are used for a constituent identical to or corresponding to that in the third embodiment, descriptions thereof are omitted as appropriate, and differences are mainly described. In the present embodiment, there is a region where the first grooves 212 and the second grooves 216 are not arranged alternately in a case where the channel-forming substrate 110 is viewed from above. The present embodiment aims to further increase the rigidity of the channel-forming substrate 110.

Figure 15:
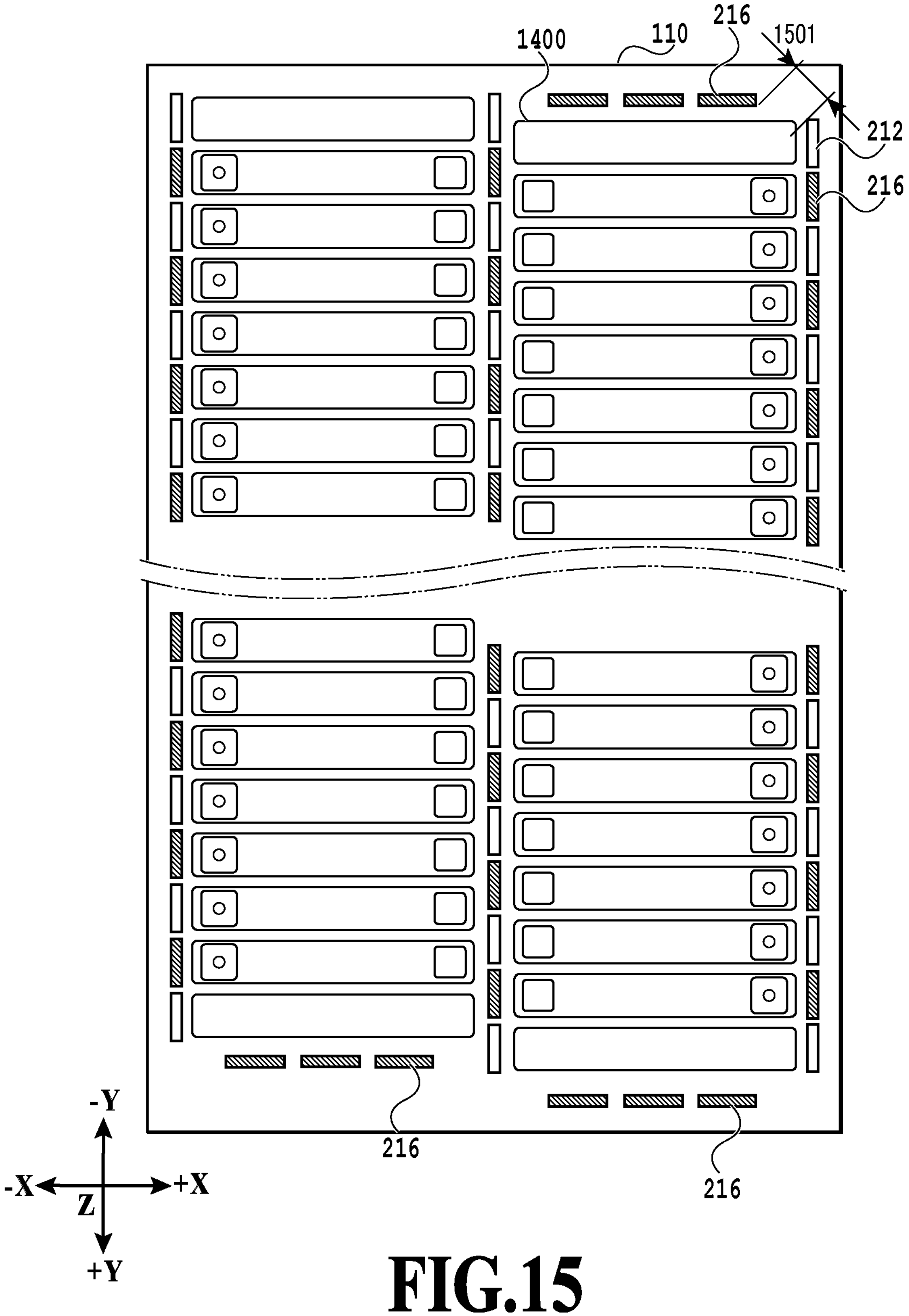
FIG. 15 is a schematic diagram showing an example of an arrangement of the grooves according to one embodiment.

FIG. 15 is a schematic diagram showing an example of an arrangement of grooves according to the present embodiment.

As shown in FIG. 15, in the present embodiment, the first grooves 212 are not arranged along a long side of the non-ejection opening 1400. That is, two of the second grooves 216 are arranged without interposing the first groove 212 in a separation portion 1501 at a corner of the non-ejection opening 1400 according to the present embodiment. Thus, the separation portion 1501 at the corner of the non-ejection opening 1400 according to the present embodiment is larger than the separation portion 1401 (see FIGS. 14A and 14B).

Accordingly, the adhesion surface area between the second substrate member 211 and the third substrate 203 at a corner of the non-ejection opening 1400 is larger than in the example in FIG. 14A. Thus, such a configuration makes it possible to increase the rigidity of the channel-forming substrate 110 as compared with that in the third embodiment.

Fifth Embodiment

A fifth embodiment in the technique according to the present disclosure will be described below with reference to the drawings. In the following description, the same reference numeral and name are used for a constituent identical to or corresponding to that in the fourth embodiment, descriptions thereof are omitted as appropriate, and differences are mainly described. In the present embodiment, the non-ejection opening 1400 is also used as a groove for releasing a bonding adhesive. The present embodiment aims to increase the rigidity of the channel-forming substrate 110.

Figure 16:
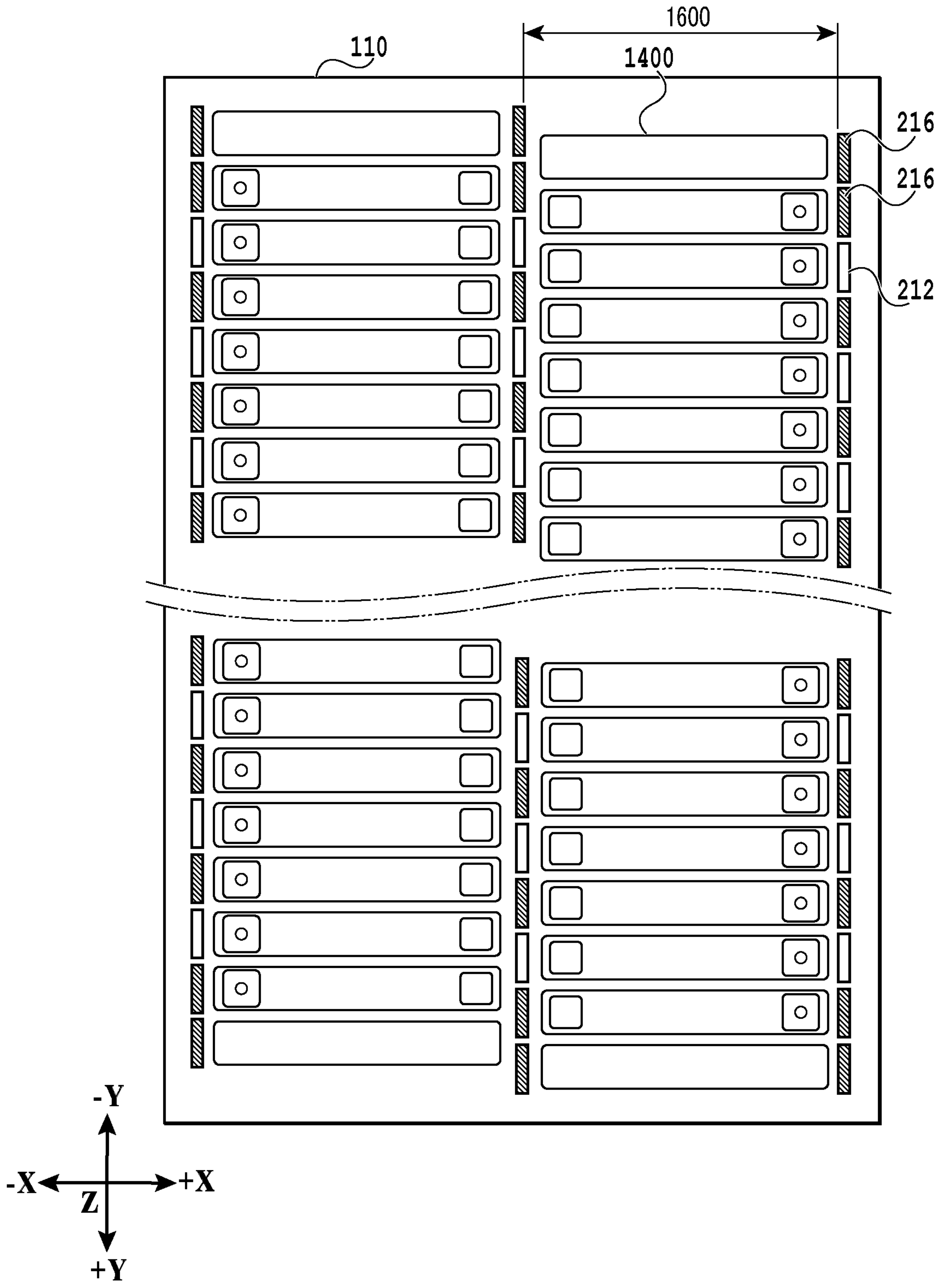
FIG. 16 is a schematic diagram showing an example of an arrangement of the grooves according to one embodiment.

FIG. 16 is a schematic diagram showing an example of an arrangement of grooves according to the present embodiment.

As shown in FIG. 16, in the present embodiment, with the second substrate member 211 and the third substrate 203 bonded to each other, the first grooves 212 and the second grooves 216 are not arranged along a long side of the non-ejection opening 1400. However, in the present embodiment, the non-ejection opening 1400 is used as a groove for releasing a protruding bonding adhesive. Further, a region along a long side of the non-ejection opening 1400 is used as a bonding region 1600 for bonding the second substrate member 211 and the third substrate 203 together. Furthermore, in the channel-forming substrate 110 according to the present embodiment, the first grooves 212 and the second grooves 216 are not arranged alternately with the second substrate member 211 and the third substrate 203 bonded to each other. Thus, in the present embodiment, the proportion of the number of first grooves 212 to be arranged is different from the proportion of the number of second grooves 216 to be arranged.

For example, it is preferable that the proportion of either one of the number of first grooves 212 and the number of second grooves 216 relative to the sum of the number of first grooves 212 and the number of second grooves 216 be 30 to 70%. Preferably, the proportion of either one of the number of first grooves 212 and the number of second grooves 216 relative to the sum of the number of first grooves 212 and the number of second grooves 216 is 40 to 60%. More preferably, the proportion of either one of the number of first grooves 212 and the number of second grooves 216 relative to the sum of the number of first grooves 212 and the number of second grooves 216 is 45 to 55%.

With such a configuration, since no groove is arranged in the bonding region 1600, the adhesion surface area between the second substrate member 211 and the third substrate 203 is larger than that in the example in FIG. 15. A bonding adhesive is then released to the non-ejection opening 1400. Thus, even in a case where neither the first groove 212 nor the second groove 216 is arranged in the bonding region 1600, a protruding bonding adhesive can be released. That is, even with such a configuration, the amount of bonding adhesives that can be released is not reduced. Thus, the rigidity of the channel-forming substrate 110 according to the present embodiment can be increased.

Sixth Embodiment

A sixth embodiment in the technique according to the present disclosure will be described below with reference to the drawings. In the following description, the same reference numeral and name are used for a constituent identical to or corresponding to that in the first to fifth embodiments, descriptions thereof are omitted as appropriate, and differences are mainly described. In the present embodiment, the first groove 212 and the second groove 216 are arranged in a position where the first groove 212 and the second groove 216 do not overlap each other in a state where the channel-forming substrate 110 is viewed from above. The present embodiment aims to further increase the rigidity of the channel-forming substrate 110.

Figure 17A:
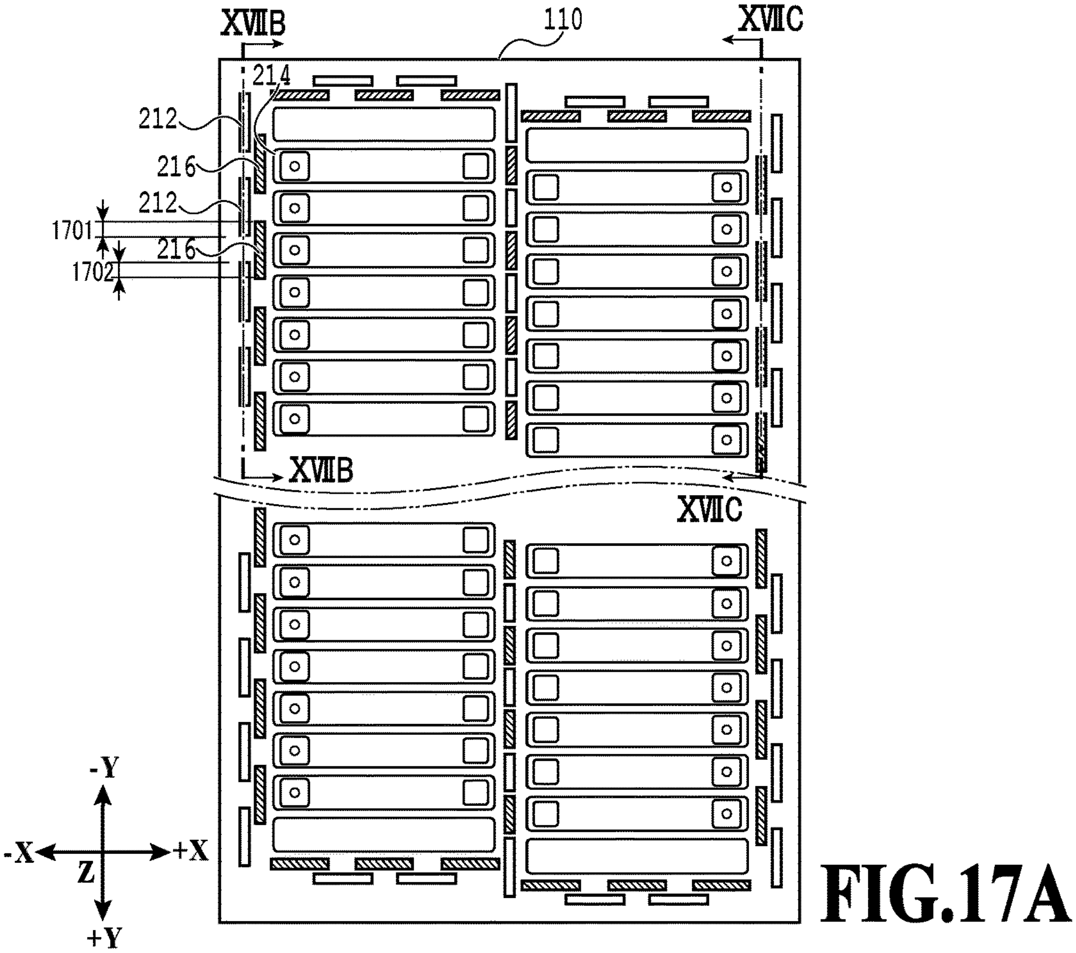
FIGS. 17A to 17C are schematic diagrams showing an example of an arrangement of the grooves according to one embodiment.
Figure 17B:
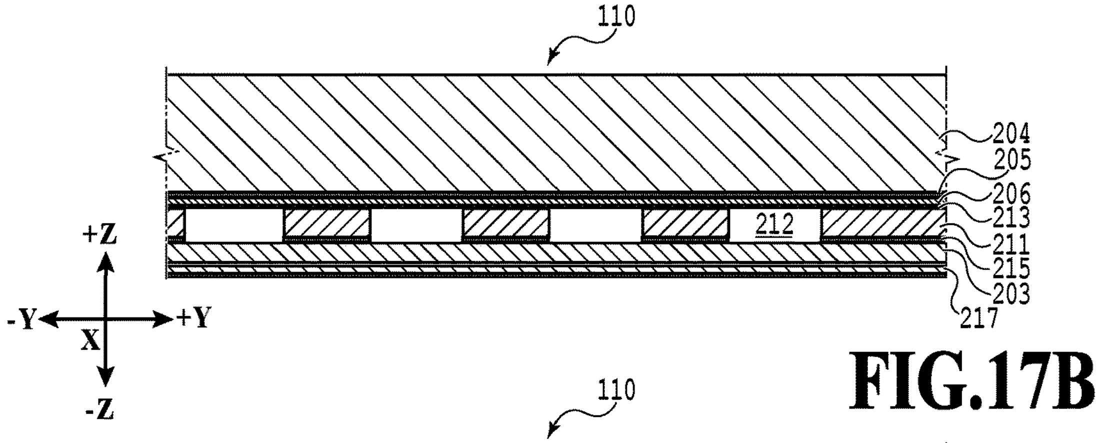
Figure 17C:
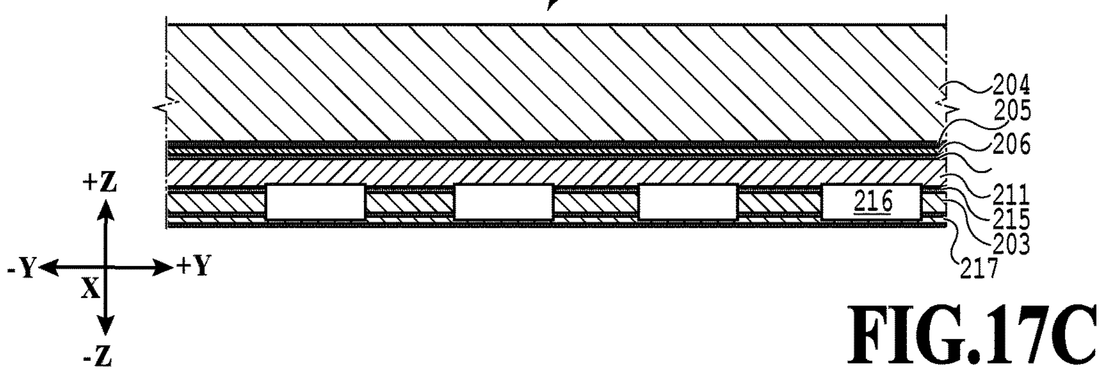

FIGS. 17A to 17C are schematic diagrams showing an example of an arrangement of grooves according to the present embodiment. FIG. 17A is a schematic plan view in a case where the channel-forming substrate 110 according to the present embodiment is seen through. FIG. 17B is a cross-sectional view taken along line XVIIb-XVIIb in FIG. 17A. FIG. 17C is a cross-sectional view taken along line XVIIc-XVIIc in FIG. 17A.

As shown in FIG. 17A, in the present embodiment, there is a region where the plurality of first grooves 212 and the plurality of second grooves 216 are arranged in a staggered pattern with the channel-forming substrate 110 viewed from above. In the present example, the first groove 212 is arranged farther from the pressure chamber 214 than the second groove 216. With such a configuration, a distance from the pressure chamber 214 arranged in the second substrate member 211 to the first groove 212 increases, and the thickness of the wall of the pressure chamber 214 (the length in the right-and-left direction in the figure) substantially increases. Thus, the rigidity of the channel-forming substrate 110 is increased by an increase in the thickness of the wall of the pressure chamber 214 as compared with that in the first to fifth embodiments.

Further, the second groove 216 has a first overlap region 1701 and a second overlap region 1702 that overlap respective portions of the adjacent two of the first grooves 212 in the right-and-left direction in the figure. With such a configuration, even in a case where a bonding adhesive cannot be released to one of the second groove 216 and the first groove 212, it may be possible to release the bonding adhesive to the other groove. In other words, with such a configuration, even in a case where the first groove 212 and the second groove 216 are not communicated with each other, the possibility that protrusion of a bonding adhesive can be suppressed is not reduced.

As shown in FIG. 17B, in the present embodiment, the first groove 212 is arranged in a position not facing the second groove 216 with the second substrate member 211 and the third substrate 203 bonded to each other. As shown in FIG. 17C, in the present embodiment, the second groove 216 is arranged in a position not facing the first groove 212 with the second substrate member 211 and the third substrate 203 bonded to each other.

Such a configuration increases the adhesion surface area between the second substrate member 211 and the third substrate 203 as compared with that in the first to fifth embodiments. Thus, the rigidity of the channel-forming substrate 110 according to the present embodiment can be increased as compared with that in the first to fifth embodiments.

Seventh Embodiment

A seventh embodiment in the technique according to the present disclosure will be described below with reference to the drawings. In the following description, the same reference numeral and name are used for a constituent identical to or corresponding to that in the first to sixth embodiments, descriptions thereof are omitted as appropriate, and differences are mainly described. In the present embodiment, the plurality of first grooves 212 and the plurality of second grooves 216 different in shape, size, or both of them are arranged in combination. The present embodiment aims to further increase the rigidity of the channel-forming substrate 110.

Figure 18A:
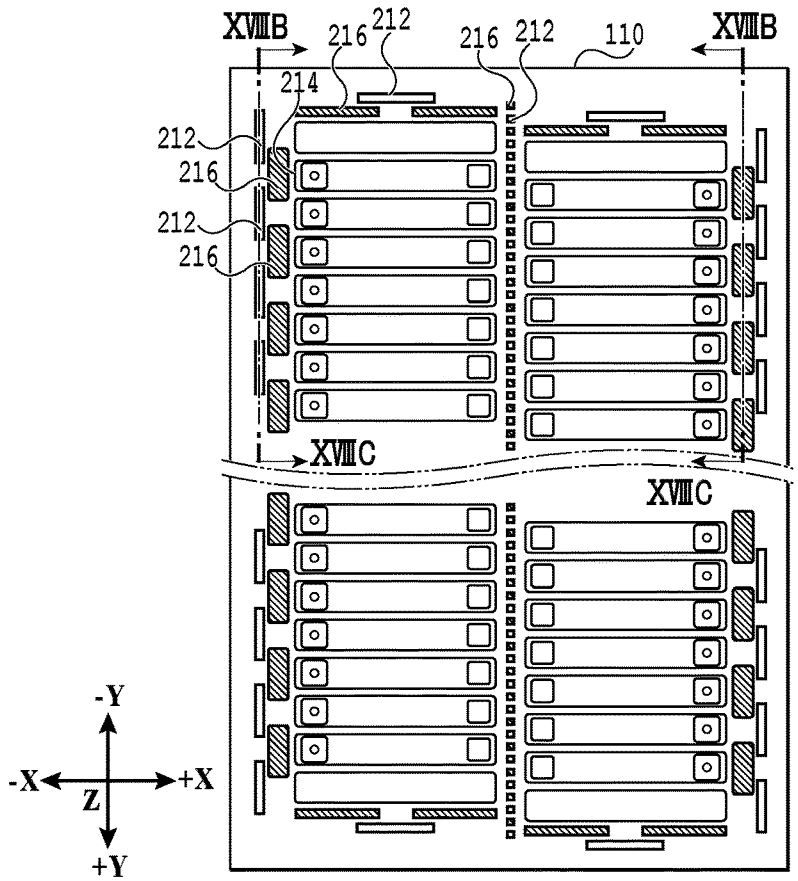
FIGS. 18A to 18C are schematic diagrams showing an example of an arrangement of the grooves according to one embodiment.
Figure 18B:
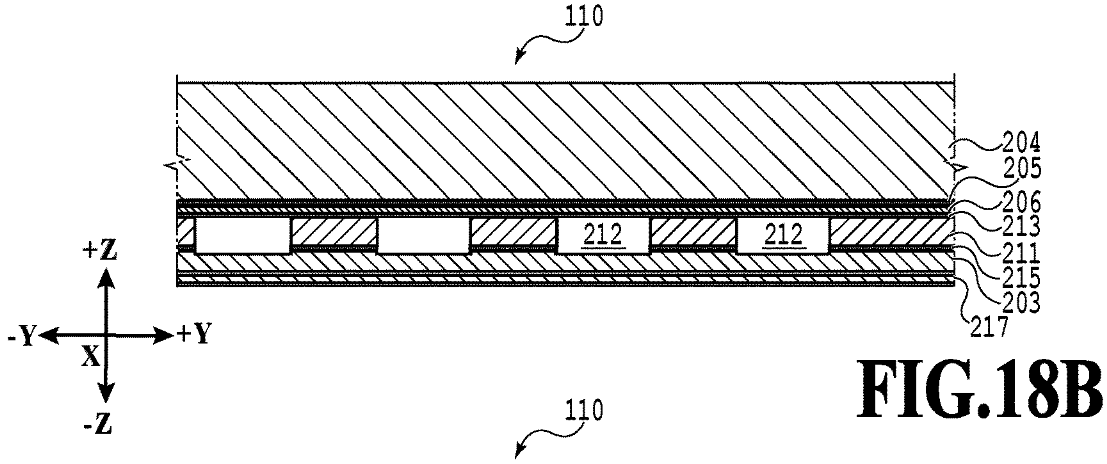
Figure 18C:
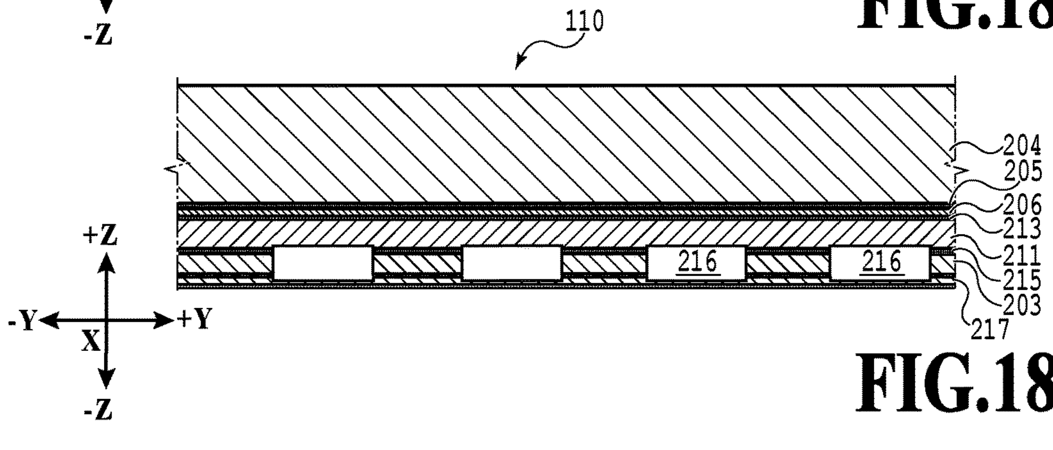

FIGS. 18A to 18C are schematic diagrams showing an example of an arrangement of grooves according to the present embodiment. FIG. 18A is a schematic plan view in a case where the channel-forming substrate 110 according to the present embodiment is seen through. FIG. 18B is a cross-sectional view taken along line XVIIIb-XVIIIb in FIG. 18A. FIG. 18C is a cross-sectional view taken along line XVIIIc-XVIIIc in FIG. 18A.

As shown in FIG. 18A, in the present embodiment, the plurality of first grooves 212 and the plurality of second grooves 216 different in shape, size, or both of them are arranged. For example, the second grooves 216 having a relatively large width (the length in the right-and-left direction in the figure) are arranged along a short side of the pressure chamber 214. The second grooves 216 and the first grooves 212 having a width (the length in the right-and-left direction in the figure) smaller than those of the second grooves 216 are arranged in a staggered pattern.

The second grooves 216 having a relatively small width (the longitudinal length in the figure) are arranged along a long side of the non-ejection opening 1400. The second grooves 216 and the first grooves 212 having approximately the same width (the longitudinal length in the figure) as those of the second grooves 216 are arranged in a staggered pattern.

Between the short side of the pressure chamber 214 on the left side in the figure and the short side of the pressure chamber 214 on the right side in the figure, the first grooves 212 which are relatively small in size and the second grooves 216 are alternately arranged in a single row.

Such a configuration also makes it possible to suppress protrusion of a bonding adhesive while further increasing rigidity.

Eighth Embodiment

An eighth embodiment in the technique according to the present disclosure will be described below with reference to the drawings. In the following description, the same reference numeral and name are used for a constituent identical to or corresponding to that in the first to seventh embodiments, descriptions thereof are omitted as appropriate, and differences are mainly described. The present embodiment is different from the first to seventh embodiments in that the second groove 216 gradually narrows toward the bottom. The present embodiment aims to suppress protrusion of a bonding adhesive while further increasing the rigidity of the channel-forming substrate 110.

Figure 19A:
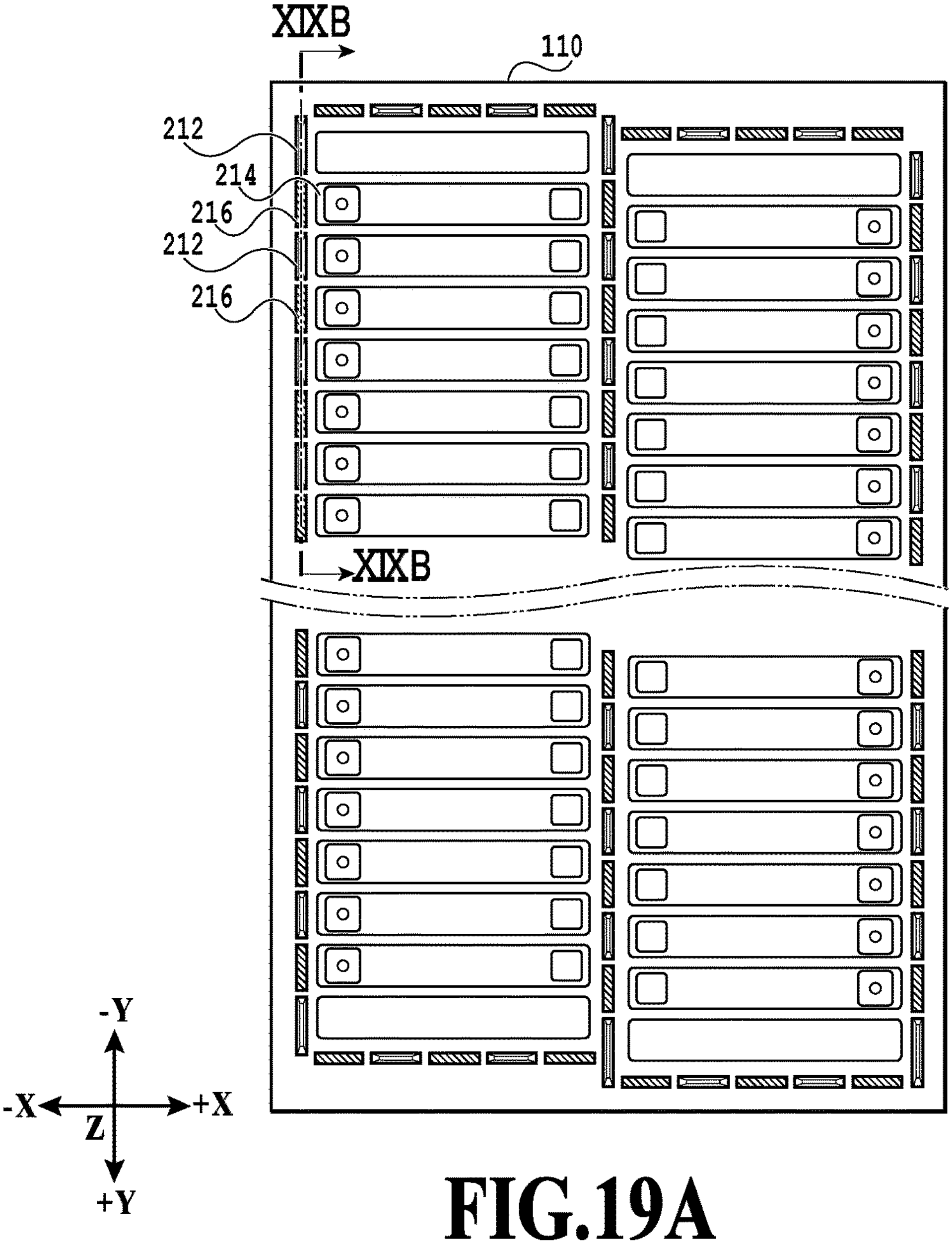
FIGS. 19A and 19B are schematic diagrams showing an example of an arrangement of the grooves according to one embodiment.
Figure 19B:
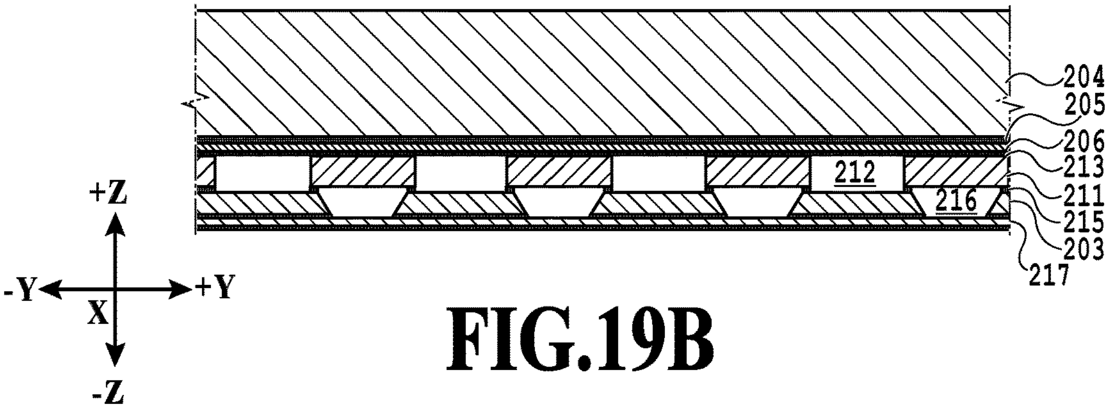

FIGS. 19A and 19B are schematic diagrams showing an example of an arrangement of grooves according to the present embodiment. FIG. 19A is a schematic plan view in a case where the channel-forming substrate 110 according to the present embodiment is seen through. FIG. 19B is a cross-sectional view taken along line XIXb-XIXb in FIG. 19A.

As shown in FIG. 19A, in the present embodiment, in a case where the second substrate member 211 and the third substrate 203 are viewed from above with the second substrate member 211 and the third substrate 203 bonded to each other, the plurality of first grooves 212 and the plurality of second grooves 216 are alternately arranged so as not to be communicated with each other.

As shown in FIG. 19B, in the present embodiment, a slope is formed from the opening toward the bottom of the second groove 216 so that the bottom is narrower than the opening. Such a shape makes it easier for a protruding bonding adhesive to flow along the slope toward the bottom. It is thus easier to effectively drop the bonding adhesive onto the bottom of the second groove 216. In the present embodiment, the second substrate member 211 and the third substrate 203 each of which includes the pressure chamber 214, the first groove 212, and the second groove 216 formed by dry etching and wet etching may be combined.

Such a configuration also makes it possible to suppress protrusion of a bonding adhesive while increasing rigidity.

Other Embodiment

In the fifth step in the first embodiment, the second substrate member 211 and the third substrate 203 are bonded to each other so that the first groove 212 and the second groove 216 are communicated with each other. On the other hand, in a case where there is a region where the first groove 212 and the second groove 216 are not communicated with each other as in FIG. 13B, it is only required that the second substrate member 211 and the third substrate 203 be bonded to each other without bringing the region into communication.

In the first to eighth embodiments, the first to third substrates are bonded to each other. However, the number of substrates is not limited to three as long as a protruding bonding adhesive can be released to a groove.

In the sixth step in the first embodiment, the third substrate 203 is thinned. However, in a case where the thickness of the third substrate 203 is sufficiently small to the extent that there is no need to thin the third substrate 203, the third substrate 203 does not have to be thinned.

In the first to eighth embodiments, a piezoelectric element is used as an energy generating element. However, an element such as a heater element that boils liquid by electrification heating may be used.

In the first to eighth embodiments, the first groove 212 and the second groove 216 mainly suppress a bonding adhesive flowing into the pressure chamber 214. A groove may be formed in the bonding surface, bonded to the second substrate 202, of the first substrate 201, and a groove facing the above groove may be formed in the bonding surface, bonded to the first substrate 201, of the second substrate 202. Such a combination of the grooves makes it possible to suppress a bonding adhesive flowing into the accommodation space 207. Incidentally, the configurations of the first to eighth embodiments also make it possible to suppress a bonding adhesive flowing into the lead-in channel 210. However, such a combination of the grooves makes it easier to suppress a bonding adhesive flowing into the lead-in channel 210.

In the first to eighth embodiments, the pressure chamber 214 is an opening that penetrates the second substrate member 211 with the second substrate 202 and the first substrate 201 not bonded to each other. However, the pressure chamber 214 may be formed so as not to penetrate the second substrate member. That is, the pressure chamber 214 may be a recess instead of an opening as long as the inside liquid can be pressurized to eject liquid with the second substrate 202 and the first substrate 201 bonded to each other.

In a case where any one of the first to third substrates 201 to 203 has an ultraviolet transmission property, a bonding adhesive may be cured by an ultraviolet curing method.

The other examples of a method of applying a bonding adhesive include screen printing. In a case where a bonding adhesive is photosensitive, the bonding adhesive may be applied by photolithography patterning.

The first groove 212, the second groove 216, the pressure chamber 214, and the lead-in channel 210 may be formed simultaneously in the same step. The first groove 212, the second groove 216, the pressure chamber 214, and the lead-in channel 210 may also be formed in different steps.

The technique according to the present disclosure makes it possible to provide a channel-forming substrate capable of suppressing protrusion of a bonding adhesive while maintaining rigidity.

While the present disclosure has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-174609, filed Oct. 31, 2022 which are hereby incorporated by reference wherein in its entirety.

What is claimed is:

1. A channel-forming substrate comprising:

a first substrate in which a hollow portion to be a liquid channel is formed; and a second substrate bonded to the first substrate with a bonding adhesive, wherein, in the first substrate, a plurality of first grooves are intermittently formed in a bonding surface bonded to the second substrate, wherein, in the second substrate, a plurality of second grooves are intermittently formed in a bonding surface bonded to the first substrate, and wherein, in a case where the channel-forming substrate is viewed from above, the plurality of first grooves and the plurality of second grooves are arranged alternately so as to surround the hollow portion, and wherein one or more of the plurality of second grooves are communicated with one of the plurality of first grooves.

2. The channel-forming substrate according to claim 1, wherein the plurality of first grooves and the plurality of second grooves are arranged at intervals of 25 μm or less.

3. A channel-forming substrate comprising:

a first substrate in which a hollow portion to be a liquid channel is formed; and a second substrate bonded to the first substrate with a bonding adhesive, wherein, in the first substrate, a plurality of first grooves are intermittently formed in a bonding surface bonded to the second substrate, wherein, in the second substrate, a plurality of second grooves are intermittently formed in a bonding surface bonded to the first substrate, wherein, in a case where the channel-forming substrate is viewed from above, the plurality of first grooves and the plurality of second grooves are arranged alternately so as to surround the hollow portion, and wherein one of the plurality of first grooves and one of the plurality of second grooves, which are adjacent to each other, are arranged while not being communicated with each other via a bonding region, which has a length of 60 μm or less.

4. The channel-forming substrate according to claim 3, wherein, in the first substrate, a pressure chamber for ejecting liquid and a non-ejection opening, which is not involved in liquid ejection, are formed, and wherein, in a case where the channel-forming substrate is viewed from above, the plurality of second grooves are continuously arranged in a region along the non-ejection opening.

5. The channel-forming substrate according to claim 1, wherein each of the plurality of first grooves and each of the plurality of second grooves are different in size, shape, or both of them.

6. The channel-forming substrate according to claim 5, wherein each of the plurality of second grooves is formed so as to narrow from an opening of the each of the plurality of second grooves toward a bottom of the each of the plurality of second grooves.

7. The channel-forming substrate according to claim 1, wherein the first substrate includes a first oxide film, and wherein the first oxide film is formed in a position where the first oxide film contacts a bottom of each of the plurality of first grooves.

8. The channel-forming substrate according to claim 1, wherein the second substrate includes a second oxide film, and wherein the second oxide film is formed in a position where the second oxide film contacts a bottom of each of the plurality of second grooves.

9. The channel-forming substrate according to claim 1, wherein one of the plurality of first grooves and one of the plurality of second grooves which are adjacent to each other are arranged while not being communicated with each other via a bonding region, which has a length of 60 μm or less.

10. A print head comprising the channel-forming substrate according to claim 1, wherein the first substrate includes an energy generating element capable of providing liquid with energy, the print head further comprising:

an electric wiring substrate electrically connected to the energy generating element; and a tank holder on which a liquid tank storing liquid can be mounted.

11. A method of manufacturing a channel-forming substrate, the method comprising:

preparing a first substrate and a second substrate;

forming, in the first substrate, a liquid channel through which liquid flows and intermittently a plurality of first grooves surrounding a circumference of the liquid channel;

intermittently forming a plurality of second grooves in the second substrate;

bonding the first substrate and the second substrate using a bonding adhesive so that the plurality of first grooves and the plurality of second grooves are arranged alternately in a case where the first substrate and the second substrate are viewed from above while being bonded to each other; and cutting the first substrate and the second substrate bonded to each other to divide the channel-forming substrate into a plurality of individual pieces.

12. The method of manufacturing the channel-forming substrate according to claim 11, wherein, in the bonding, the first substrate and the second substrate are bonded to each other so that the plurality of first grooves and the plurality of second grooves are communicated with each other.

13. The method of manufacturing the channel-forming substrate according to claim 11, wherein, in the bonding, the first substrate and the second substrate are bonded to each other so that the plurality of first grooves and the plurality of second grooves are not communicated with each other.

* * * * *